United States Patent
Thomas et al.

(12)

(10) Patent No.: US 6,437,285 B1
(45) Date of Patent: Aug. 20, 2002

(54) METHOD AND APPARATUS FOR TREATING INTERIOR CYLINDRICAL SURFACES AND ABLATING SURFACE MATERIAL THEREON

(75) Inventors: James W. Thomas, Los Altos, CA (US); Terry Fuchser, Kathleen, GA (US)

(73) Assignee: General Lasertronics Corporation, San Jose, CA (US)

( * ) Notice: Subject to any disclaimer, the term of this patent is extended or adjusted under 35 U.S.C. 154(b) by 0 days.

(21) Appl. No.: 09/089,315

(22) Filed: Jun. 2, 1998

(51) Int. Cl.$^7$ .............................................. B23K 26/38
(52) U.S. Cl. .......................... 219/121.75; 219/121.68; 219/121.69; 219/121.85
(58) Field of Search ...................... 219/121.63, 121.85, 219/121.75, 121.68, 121.69

(56) References Cited

U.S. PATENT DOCUMENTS

| | | | |
|---|---|---|---|
| 3,843,865 A | 10/1974 | Nath | 219/121 L |
| 3,941,973 A | 3/1976 | Luck, Jr. et al. | 219/121 L |
| 4,398,790 A | 8/1983 | Righini et al. | 350/96.18 |
| 4,449,043 A | 5/1984 | Husbands | 250/205 |
| 4,521,070 A | 6/1985 | Sottini et al. | 350/96.15 |
| 4,543,477 A | 9/1985 | Doi et al. | 250/227 |
| 4,564,736 A | 1/1986 | Jones et al. | 219/121 L |
| 4,588,885 A | 5/1986 | Lovoi et al. | 250/226 |
| 4,654,532 A | 3/1987 | Hirschfeld | 250/458.1 |
| 4,671,848 A | 6/1987 | Miller et al. | 156/643 |
| 4,676,586 A | 6/1987 | Jones et al. | 350/96.2 |
| 4,687,918 A | 8/1987 | Hughes et al. | 250/205 |

(List continued on next page.)

FOREIGN PATENT DOCUMENTS

| FR | 2689423 | * 10/1993 |
|---|---|---|
| JP | 1-203090 | * 8/1989 |
| JP | 5-138377 | * 6/1993 |

OTHER PUBLICATIONS

Mar. 1997 "Photonic Cleaning Process Moves to Heavy Industry", *Photonics Spectra*, p. 22.

(List continued on next page.)

*Primary Examiner*—Geoffrey S. Evans
(74) *Attorney, Agent, or Firm*—George M. Steres

(57) ABSTRACT

A method and system for treating internal surface material overlying the interior of a tubular a substrate, and more particularly, to a system for ablating contaminates and other unwanted material from an internal surface 52 using a pulsed laser beam (38). The system includes three main sub-systems: a back end (30), a work head (100), and an umbilical tube (31) to protect conduits communicating between the back end (30) and the work head (100). The back end (30) includes heavy and bulky equipment such as a laser (32), chiller (4), pressurized air source (70), suction system (84), waste containment system (82), and electric power source (78). A conveyance such as a trailer (17) may enclose the back end (30) to make it transportable. The work head (100) includes a propeller driven rotating mirror assembly (380), and a lens assembly (520). During operation, the work head (100) is inserted in the tube or pipe and the laser (32) activated. An air flow (98) in the tube drives the propeller (500) to rotate the mirror (168). The mirror assembly (380) in the work head (100) distributes pulses from the laser beam in a circle (610) described about the axis (54) of the work head (100) and directs them to the interior surface material. Ablated detritus is swept away and suctioned through a conduit attached to the tube behind the work head (100) and thence to the waste containment system (82) in the back end (30). Electric power, laser energy, control and monitor signals, air, and suction are transported between the back end (30) and the work head (100) through the conduits encased within the umbilical tube (31). The umbilical tube (31) may be used to draw the work head (100) out of the tube to clean the entire interior surface (52).

18 Claims, 18 Drawing Sheets

U.S. PATENT DOCUMENTS

| | | | | |
|---|---|---|---|---|
| 4,707,073 | A | * 11/1987 | Kocher | |
| 4,729,621 | A | 3/1988 | Edleman | 350/96.15 |
| 4,737,004 | A | 4/1988 | Amitay et al. | 350/96.15 |
| 4,737,628 | A | 4/1988 | Lovoi | 606/12 |
| 4,756,765 | A | 7/1988 | Woodroofe | 134/1 |
| 4,762,385 | A | 8/1988 | Fuse | 350/96.18 |
| 4,799,755 | A | 1/1989 | Jones | 350/96.18 |
| 4,807,954 | A | 2/1989 | Oyamada et al. | 350/96.15 |
| 4,818,049 | A | 4/1989 | Assenheim et al. | 350/96.15 |
| 4,818,062 | A | 4/1989 | Scifries et al. | 350/96.29 |
| 4,821,943 | A | * 4/1989 | Gaudin et al. | |
| 4,842,360 | A | 6/1989 | Caro et al. | 350/96.18 |
| 4,844,574 | A | 7/1989 | Chande | 350/96.18 |
| 4,876,444 | A | 10/1989 | Field | 250/214 AL |
| 4,920,994 | A | 5/1990 | Nachbar | 134/1 |
| 4,944,567 | A | 7/1990 | Kuper et al. | 350/96.18 |
| 4,960,988 | A | 10/1990 | Simms | 250/213 VT |
| 5,006,268 | A | * 4/1991 | Griffaton | 219/121.63 |
| 5,068,750 | A | 11/1991 | Cook et al. | 359/399 |
| RE33,777 | E | 12/1991 | Woodroofe | |
| 5,113,802 | A | 5/1992 | Le Blanc | 122/379 |
| 5,151,134 | A | 9/1992 | Boquillon et al. | 134/1 |
| 5,229,593 | A | 7/1993 | Cato | 250/205 |
| 5,245,682 | A | 9/1993 | Ortiz, Jr. | 385/33 |
| 5,291,570 | A | 3/1994 | Filgas et al. | 385/78 |
| 5,293,023 | A | 3/1994 | Haruta et al. | 219/121.6 |
| 5,333,218 | A | 7/1994 | Ortiz, Jr. | 385/43 |
| 5,355,063 | A | * 10/1994 | Boone et al. | |
| 5,371,582 | A | 12/1994 | Toba et al. | |
| 5,373,140 | A | 12/1994 | Nagy et al. | 219/121.68 |
| 5,395,362 | A | 3/1995 | Sacharoff et al. | 606/17 |
| 5,446,256 | A | * 8/1995 | Cartry | 219/121.63 |
| 5,451,765 | A | 9/1995 | Gerber | 250/205 |
| 5,531,857 | A | 7/1996 | Engelsberg et al. | 156/345 |
| 5,558,666 | A | 9/1996 | Dewey et al. | 606/9 |
| 5,589,089 | A | * 12/1996 | Uesugi | 219/121.6 |
| 5,592,879 | A | 1/1997 | Waizmann | 101/416.1 |
| 5,610,753 | A | 3/1997 | Kessler et al. | 359/205 |
| 5,637,245 | A | 6/1997 | Shelton et al. | 219/121.85 |
| 5,780,806 | A | * 7/1998 | Ferguson et al. | 219/121.68 |

OTHER PUBLICATIONS

Aug. 8, 1994 "Radiant Energy Based Cleaning and Coating Removal Technology Comparison", INTA Corp.

Jun. 9–11, 1992 Philip A. Barone, "Automated Laser Paint Stripping (ALPS)," Society of Manufacturing Engineers.

1997 "The Company—The Technology," General Lasertronics Corporation.

Apr. 1997 "Lasertronics—Corporate Overview," General Lasertronics Corporation.

Apr. 1997 "Lasertronics—Aircraft Paint Removal," General Lasertronics Corporation.

Apr. 1997 "Lasertronics—Radiation/Medical," General Lasertronics Corporation.

Apr. 1997 "Lasertronics—Graffiti Abatement," General Lasertronics Corporation.

Apr. 1997 "Lasertronics—Lead–based Paint Removal," General Lasertronics Corporation.

Dec. 1978 Walter G. Driscoll and William Vaughan, eds, Handbook of Optics, pp. 13–6–13–10.

Jul. 20, 1995 Katherine Liu and Elsa Garmire, "Paint Removal Using Lasers," Applied Optics vol. 34, No. 21, pp. 4409–4415.

Nov. 1994 Paul Lovoi, "Laser Paint Stripping Offers Control and Flexibility," Laser Focus World, pp. 75–80.

Aug. 1991 R. Bonkowski and V.E. Merchant, "CW Laser Paint Stripping".

Undated Paul Lovoi, "Laser/Robot Paint Stripping: Laser Ablation Coating Removal," International Technical Associates.

* cited by examiner

FIG. 7
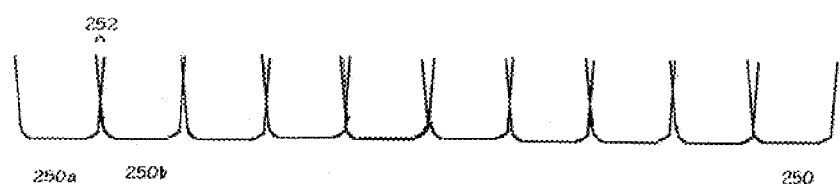
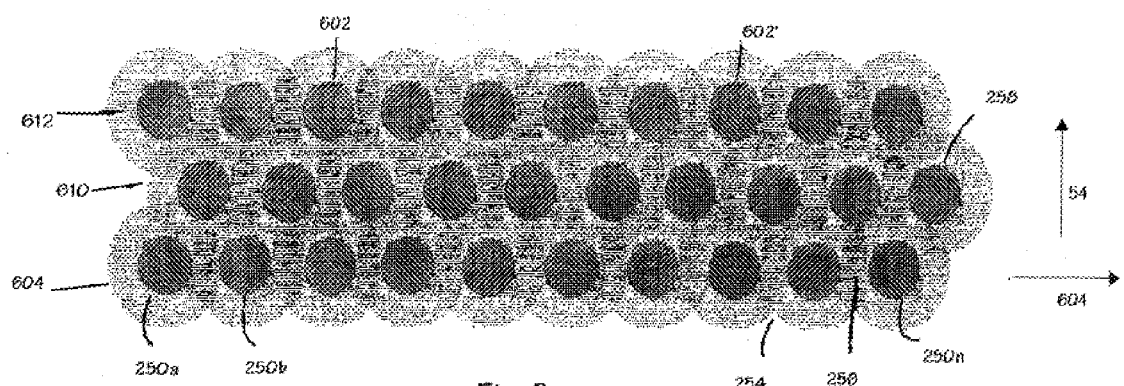
Fig. 8

METHOD AND APPARATUS FOR TREATING INTERIOR CYLINDRICAL SURFACES AND ABLATING SURFACE MATERIAL THEREON

FIELD OF THE INVENTION

The present invention relates to a system for treating surface material overlying a cylindrical interior work surface, and more particularly, to a system for ablating contaminates and other unwanted material from a cylindrical interior worksite using a laser.

BACKGROUND OF THE INVENTION

Using industrial lasers to treat surface material is known in the prior art. These treatments include glazing, sealing, marking, and drilling. Of particular relevance to this invention are a number of proposals to remove, by laser ablation, material from an underlying substrate. For example, United States patents have issued for removing paint, grease, dirt, rubber, ceramic, mineral scale, dielectric, and electrical conductor surface material by means of laser ablation. See:

U.S. Pat. No. Re. 33,777 issued to Woodroffe [paint, grease, and ceramics]
U.S. Pat. No. 5,592,879 issued to Waizmann [dirt]
U.S. Pat. No. 5,637,245 issued to Shelton et al. [rubber]
U.S. Pat. No. 5,113,802 issued to Le Blanc (mineral scale]
U.S. Pat. No. 4,671,848 issued to Miller et al. [dielectric coating]
U.S. Pat. No. 3,941,973 issued to Luck et al. [electric conductor]

Previously, removing surface material frequently required physical or chemical methods. These methods included physical abrasion, blasting surfaces with media such as sand, and using chemical solvents. Not only did these methods often damage the substrate, but the removal of surface material created a new problem; disposing of a waste stream bloated with contaminated cleaning material.

The potential commercial advantages of using laser ablation are significant. Not only is the waste stream to be treated and disposed of much reduced but also there is potentially less recontamination of the surface itself For example, chemicals used in the prior art to strip surface contaminates themselves could recontaminate the surface. Another advantage is t hat a beam of electromagnetic radiation may be fine-tuned to ablate surface material ranging from micro fine contaminants to visible discrete particles. And, of course, the beam can navigate exceedingly narrow passageways as well as ablate material from microscopic pores. However the problems inherent in creating a workable system have limited laser ablation technology to a few niche applications. These problems include high cost, non transportable equipment, contamination of optics by ablated material, laser damage to internal optics, deficient feedback and control, inadequate safety systems, lack of ablation waste collection and containment, the need to isolate sensitive equipment from soiled worksites, interference of ablation detritus with the beam at the work surface, and the difficulty of delivering a quality beam of electromagnetic radiation over a distance.

Removing contaminates from the inside of tubes and pipes is particularly difficult; first because of the difficulty of accessing the contaminated area, i.e., a long tube requires a long tool which may be difficult or impossible to manipulate; second the hazard of leaving contaminates behind; thirdly, in using chemicals to remove contaminates from tubes there is the additional difficulty in removing solvent residue, leading to recontamination later on.

Aircraft oxygen systems include many pipes of small diameter, which must be cleaned thoroughly without leaving any chemical residue, which could adversely affect passengers or crew. Gaseous diffusion plants have miles of piping, which are contaminated with highly toxic materials that must be removed safely and completely. The is a great need and ready market for a system and process for readily cleaning the inside of tubes and pipes that eliminates the use of solvents and can safely remove the reaction products of cleaning.

SUMMARY OF THE INVENTION

The present invention has as its object to provide a method and apparatus by which surface material may be ablated effectively and safely with minimal collateral damage to the worksite. The primary components of the apparatus are a back end system (kept distant from the worksite), a work head, and an umbilical tube connecting the back end and the work head.

A design philosophy of this invention is to isolate bulky equipment in the back end, which may be housed inside a small truck or trailer, to make the work head lightweight and durable enough to be handheld or incorporated in a robotic arm, and to link the back end and work head with the umbilical tube.

The laser in the back end generates a pulsed input beam of electromagnetic radiation, preferably a CO2 or a Q-switched Nd: YAG laser emitting coherent infrared light. The beam is collimated and focused onto a collector face of a fiber optic strand. The fiber is tapered from the collector face to the strand body. Then the pulsed beam travels along the strand body, enclosed in the umbilical tube, until it reaches the work head and emerges from an exit face. After lenses within the work head recollimate and refocus the beam, an angled rotating mirror spinning on the body axis of the work head receives the beam and directs the series of pulses outward from the work head axis, in a circular or spiral path to the work surface on the inside of the tube. In addition to incorporating the fiber exit face, lenses, and rotating mirror, an embodiment of the work head includes a propeller mounted on a rotatable body section containing the mirror with the propeller driven by an air stream flowing in the tube past the work head body. The air stream also provides the benefit of cooling the work head and associated mirror and lenses while additionally carrying away the reaction products of the decomposed surface material.

The work head is aligned with the central axis of the workpiece tube (i.e., a pipe or tube of larger diameter) and inserted therein up to a depth as much as the length of a connected umbilical tube. A preferred embodiment of the intention has resilient fingers mounted on the front and rear of the work head to support it inside the tubular workpiece while the umbilical tube draws the work head distally through the tube. An operator activates the ablation process after setting controls to establish the rotation speed of the mirror (the air flow), and the withdrawal rate of the work head by pinch rollers frictionally engaged on the distal part of the umbilical tube between the work head and the back end. A safety interlock system, serves as a safety measure; if the work head is not installed in the workpiece tube with proper covers at the ends, the interlock deactivates the laser.

Exterior to the work head are an exhaust outlet receiving the contaminated air stream connected to a hose and a blower to evacuate ablated detritus. The air stream is drawn in through a laser light baffle from ambient air at the front of the workpiece tube, and flows along the body of the work head between the body and the interior work surface of the surrounding tube. The air stream drives angled fan vanes of a propeller connected to the outside of a free spinning tubular mirror assembly containing the work head mirror. At either end of the mirror assembly there are mounted circumferentially rotating ball bearing races mounted to the associated front and back portions of the work head. Optionally, another sub-system connected to the workpiece forces a substantially inert gas (an "air knife") in place of the ambient air, across the surface being ablated to sweep detritus away from the beam and into the evacuation system.

Ablated material and debris are kept out of contact with the exit face of the laser fiber by a clear window between the mirror and the exit face. The natural divergence of the beam exiting the exit face and the spacing of the window prevents the laser power from damaging the window.

Other subsystems in the back end include a power supply and distribution system (to provide electricity to subsystems in both the back end and the work head), systems to provide pressurized gas to the work piece, a system to circulate coolant through the subsystems, a blower to provide suction needed for the nozzle evacuation system, and a system to collect, filter, scrub fumes from, absorb, and otherwise contain the waste stream that the evacuation system delivers to the back end.

It is an object of the present invention to provide a method and apparatus of treating an interior tubular work surface with electromagnetic radiation while minimizing degradation and contamination of the underlying substrate.

It is a further object of the invention to isolate bulky equipment from soil environments while making the equipment transportable to stationary worksites.

It is yet a further object of the invention to protect work head optics from worksite ablation detritus.

It is yet a further object of the invention to provide a scalable compact work head capable of being scaled for hand held use of use at the end of an extension tool.

It is yet a further object of the invention to provide an efficient collection method for collecting ablation detritus and to reduce the volume of a worksite waste stream.

It is yet a further object of the invention to transport a quality electromagnetic radiation beam over distance with delivery of an effective beam ablation pattern to an interior work surface a tubular workpiece.

An advantage of the present invention is the combined laser beam scanning, debris removal and work head cooling provided by the air stream.

Other objects and advantages of the invention will be apparent from the following description, the accompanying drawings and the appended claims.

BRIEF DESCRIPTION OF DRAWINGS

In the drawings, closely related figures have the same number but different alphabetic suffixes.

FIG. 7 is a graph of laser spot intensity along the path inside the workpiece of FIG. 6.

FIG. 8 is planar projection plan view showing overlap of laser pulse impingement points along adjacent path segments inside the workpiece of FIG. 6.

DETAILED DESCRIPTION OF A PREFERRED EMBODIMENT

The following disclosure is illustrative only and not limiting. Various and numerous alternate embodiments of the present invention are made obvious to one skilled in the art in view of this disclosure.

Overview of the Present Invention

Figure 1A:
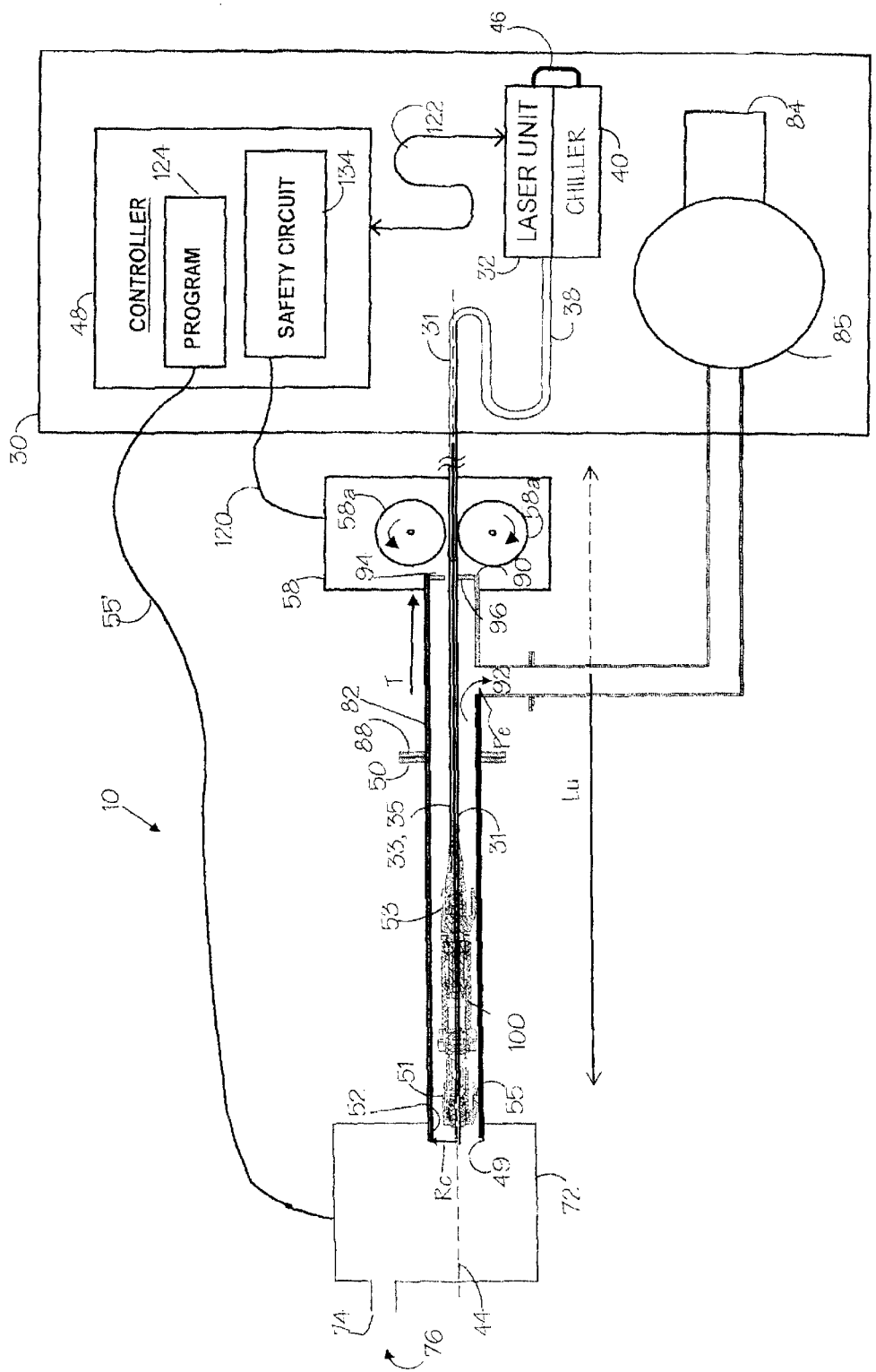
FIG. 1A is a partial cross section and schematic diagram of a preferred embodiment of a laser surface treatment apparatus for an interior of a tubular workpiece in use in accordance with the present.
Figure 1B:
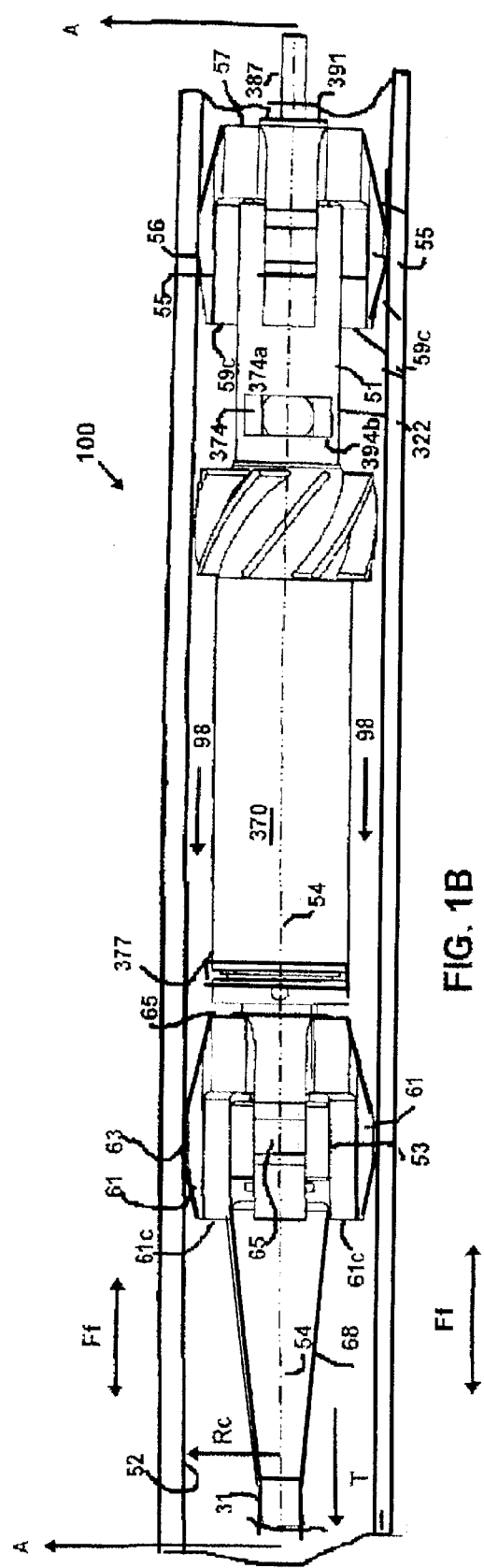
FIG. 1B is an exterior elevation view of the work head 100 of FIG. 1A.

Referring to FIG. 1A and FIG. 1B there is illustrated a preferred embodiment of the present invention, an interior surface treatment and laser ablation system 10. Ablation system 10 is shown to include a back end system 30, a work head 100 and a longitudinal umbilical tube 31. The ILAS 10 is shown in use treating a tubular workpiece 42. The tubular workpiece 42 has a internal central axis 44 with a proximal open tube end 49 and opposed distal open end 50. The tubular workpiece 42 defines an internal cylindrical volume Vw of diameter 2Rc between the proximal open tube end 49 and opposed distal open end 50. The tubular workpiece 42 has an internal cylindrical work surface 52 disposed about the central axis 44.

The laser ablatin system 10 includes the elongated work head 100 along a body axis 54. The work head 100 presents a proximal head end 51 and a distal body end 53 at respective ends of the body axis 54. The distal body end 53 connects to a proximal end of umbilical tube umbilical tube 31. The umbilical tube 31 extends to a distal end and connects to back end system 30. A suitable back end system 30 is described in previously filed patent application titled "Method and Apparatus for Treating Surfaces and Ablating Surface Material, by James W. Thomas and Roland O'Banion, filed Apr. 24, 1998 U.S. Ser. No. 09/066,039, and is hereby incorporated by reference. The back end system 30 contains a laser pulse generating base unit 32 for generating and delivering a laser beam 34 to an optical fiber 38. Fiber 38 is connected to work head 100 through umbilical tube 31.

The preferred embodiment 10 also includes a pinch roller/motor assembly 58 disposed between the work head 100 and the back end system 30. The pinch roller/motor assembly 58 is electrically connected to a controller 48 by a roller control cable 120. The controller 48 separately connects electrically to the laser 32 by a laser control cable 122. The laser control cable 122 transfers suitable interlock safety signals (received from safety interlock circuit 134) from the controller 48 that inhibit production of high power laser pulses until all safety interlocks (not shown) verify that system operation is safe. The previous patent application L007 describes in some detail various safety interlocks that may be employed by one having skill in the art. Suitable safety interlocks known in the art and described in application L007 are indicated by the safety circuit 134 in FIG. 1A for the present invention. The controller 48 includes roller/ laser program control means 124 for controlling the pinch roller/motor assembly 58 and the laser 32. Pinch rollers 58a in the pinch roller/motor assembly 58 are frictionally engaged to move the umbilical tube 31 and the attached work head 100 within the tubular workpiece 42 longitudinally parallel to the central axis 44 under control of the controller 48.

The umbilical 31* may alternatively have a rigid proximal conduit end 35 capable of holding the work head 100 by hand or robotic arm at a considerable distance into a pipe or tube 42 in the absence of supporting guide fingers 55, 61.

Figure 2:
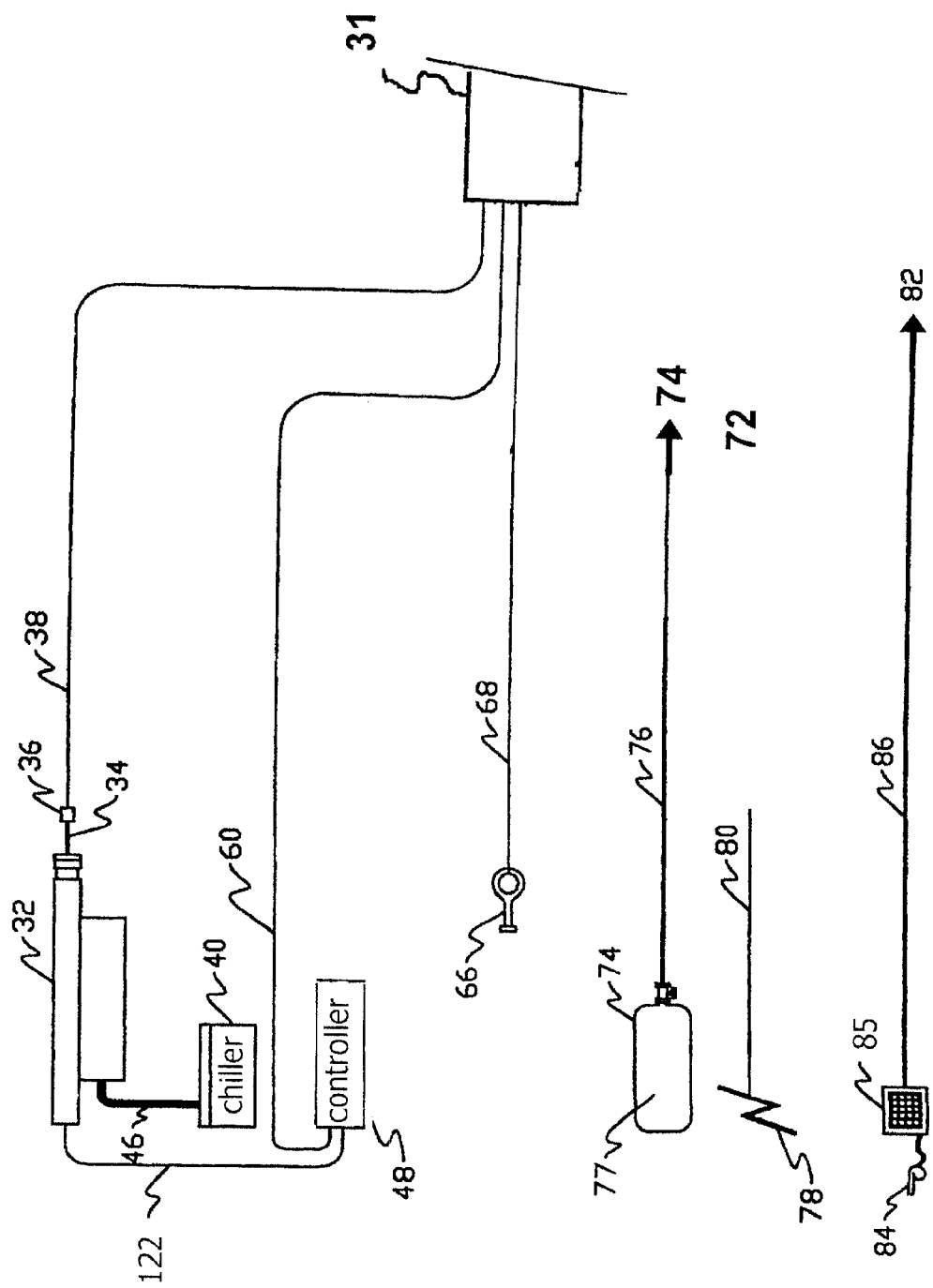
FIG. 2 is a schematic diagram of the present invention showing connections between the back end unit and the operating work head invention and a suitable pulsed laser beam generating base unit.
Figure 3:
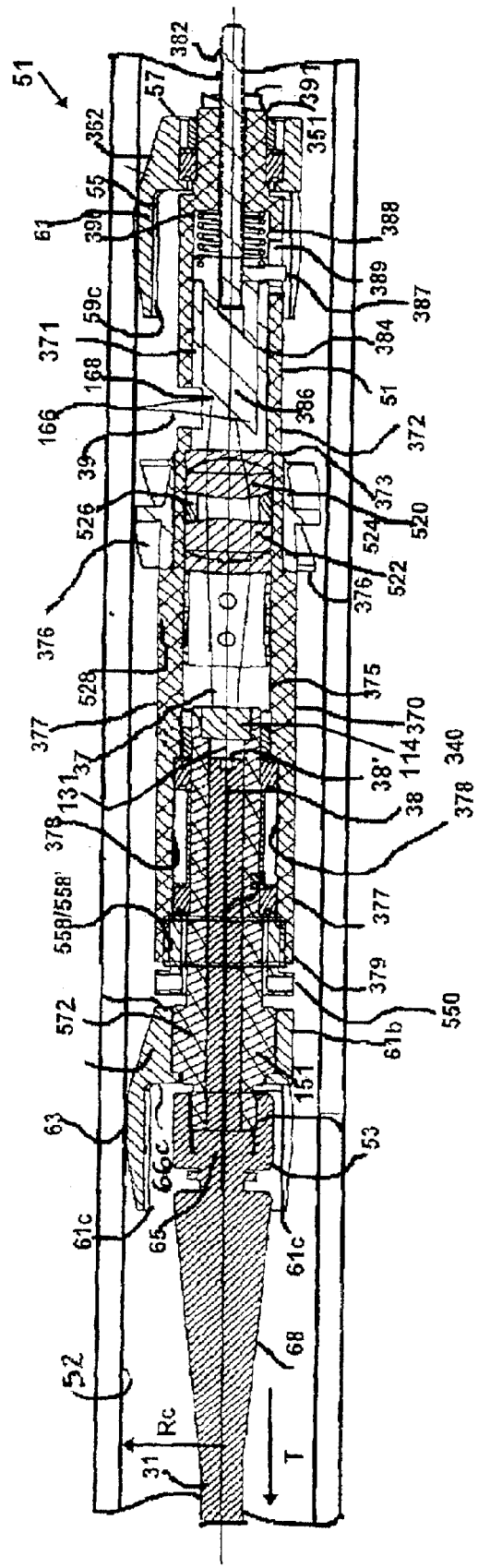
FIG. 3 shows an elevation cross section of FIG. 1B taken through the central axis of the work head.

Referring to FIG. 2, FIG. 3 in combination with FIG. 1A and FIG. 1B the work head 100 is shown to be sized to fit closely within the inside diameter 2Rc of the tubular workpiece 42 with the body axis essentially aligned with the central axis 44. To start the laser surface treatment process of the present invention, the work head 100 is aligned with and inserted into the workpiece tube 42 up to a depth less than a length of the tube 31, Lu.

The work head 100 is positioned to move slidably along the central axis 44 and essentially centered thereon by three resilient proximal guide fingers 55 at the head end 51 and three resilient distal guide fingers 61 at the distal body end 53. The three guide fingers 55 are spaced apart equiangularly around the work head body axis 54, and project radially outward therefrom to make proximal sliding contact with the proximal interior surface 56 of the tubular workpiece 42. The three distal guide fingers 61 are also spaced apart equiangularly around the work head axis 54, and project radially outward therefrom to make distal sliding contact 63 with the distal interior surface of the tubular workpiece 42.

Work head 100 comprises a cylindrical umbilical connector base 151, including a high power SMA optical connector 65. Connector base 151 includes a collar mounting surface 353 disposed on the outside of the base 151. The surface 353 is coaxial with the central axis 54 and disposed to fixedly receive corresponding coaxial internal mounting surface 64 of distal collar 62. Connector base 151 has an internal coaxial bore 154 aligned along central axis 54. Central bore 154 is adapted to fittingly receive ferrule sleeve 574 therethrough. The SMA optical connector 65 is provided with an extended tubular ferrule sleeve 572, coaxial thereto. The ferrule sleeve 572 has an internal sleeve diameter sized for receiving and positioning therein a proximal fiber exit face 38' of the optical fiber 38. The optical fiber 38 ends within the ferrule sleeve 572, at the fiber exit face 38', perpendicular to and directed proximally along the body axis 54 toward a lens assembly 520 and mirror 168.

With reference to FIG. 3, planar protective window 114 having parallel proximal and distal faces 117 and 116 is spaced between the fiber exit face 38' and the mirror 68. The window 114 is mounted with faces 116, 117 parallel thereto by attachment of outer window perimeter 115 to an internal window recess 576 formed in the proximal end of the body tube 151. The protective window 114 is made of a material or materials such as silicate glass or other suitable materials, including coated silicate glass or plastic composites, known in the art that allow the output beam 37 to pass through the window 114 without significant loss of laser energy. The umbilical connector base 151 in combination with the SMA connector, the ferrule sleeve 572 and the window 114 provide a sealed exit volume 131. The sealed exit volume 131 protects the laser emission point of the output beam at the fiber exit face 38', the laser energy fiber optic, the objective and lens system 110, the mirror and other components of the work head 100 from contamination by detritus generated during the ablation process.

The distal guide fingers 61 are attached to a distal guide collar 62 of the work head umbilical connector base 151 and project radially outward therefrom spaced equiangularly around the distal guide collar circumference. The distal guide fingers 61 are made of metal, plastic or other suitable resilient material known in the art. The fingers 55, 61 are configured and sized to be in slight inward compression when the work head 100 is inserted into the tubular workpiece 42. The distal guide fingers 61 are equipped with outermost low friction contact surfaces 63. The contact surfaces 63 make easily slidable axial contact with the interior surface 52 of the tubular workpiece 42 and are configured to keep the work head body axis 54 essentially centered with the central axis 44 of the tubular workpiece 42.

The work head umbilical connector base 151 is constructed of metal, plastic or composite materials or other suitable material known in the art that provide a rigid supporting base between distal guide collar 62 and the fiber containing ferrule sleeve 572.

Figure 4:
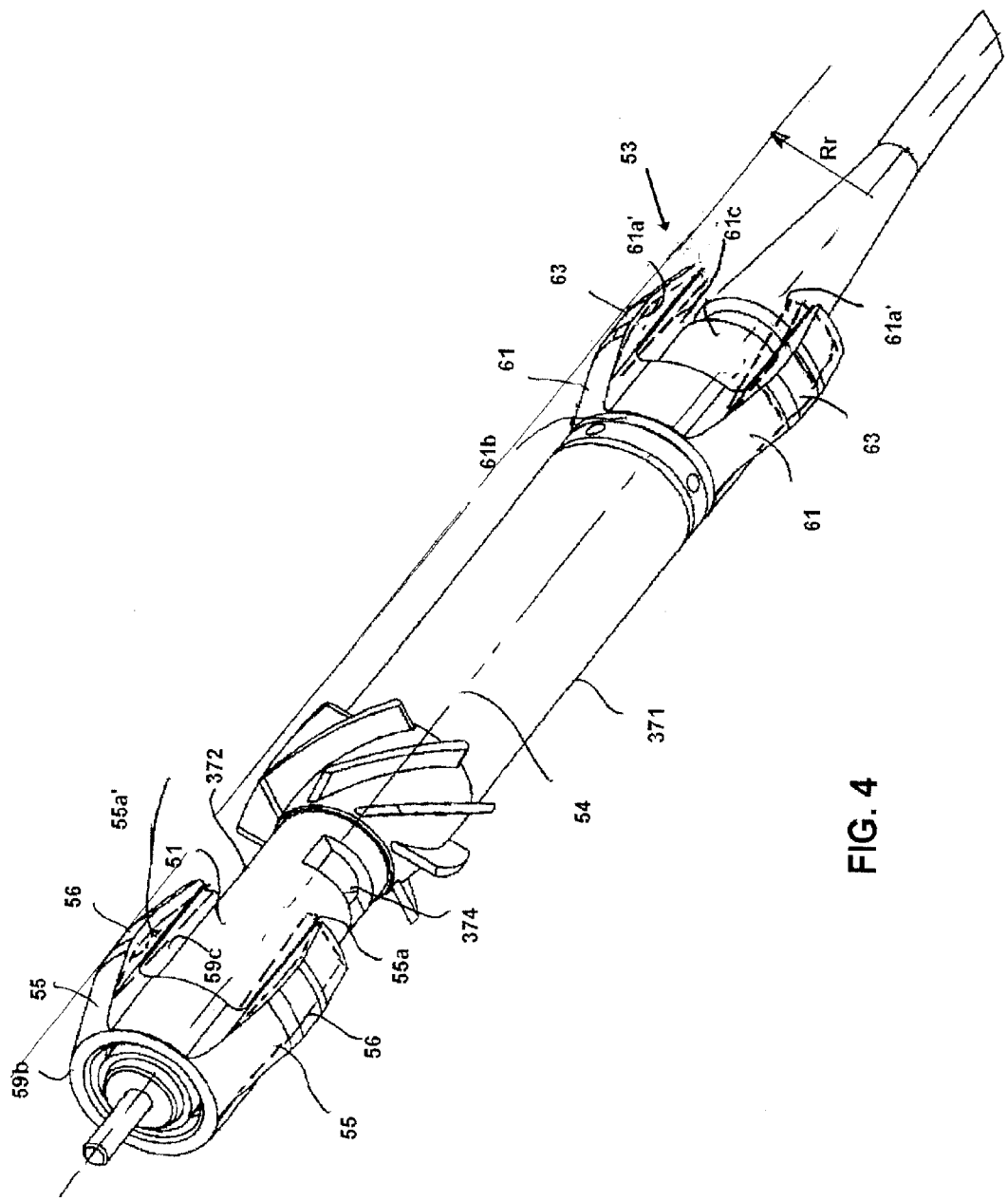
FIG. 4 is an exterior perspective view of the work head of FIG. 1.
Figure 5:
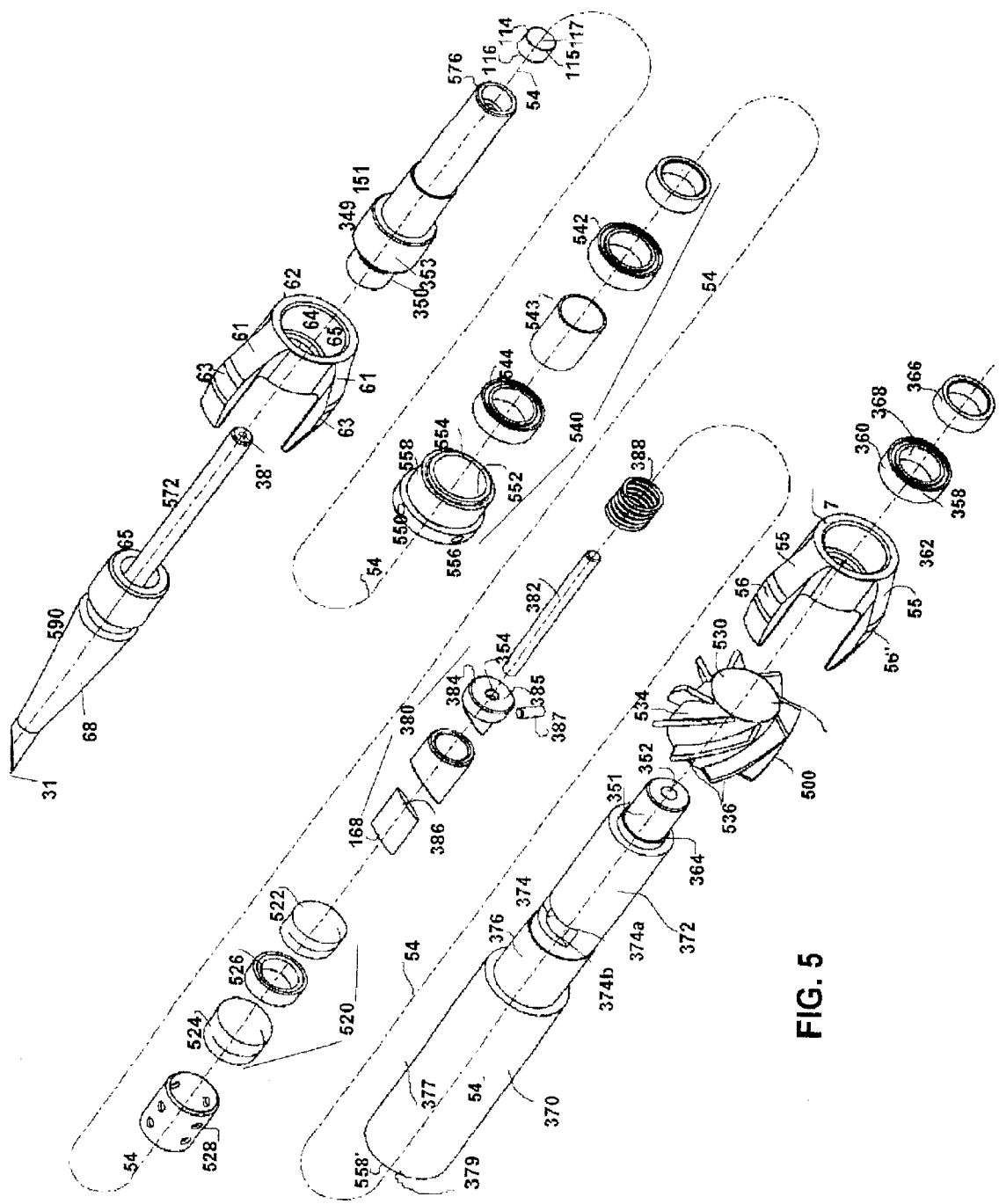
FIG. 5 is an exploded perspective view of the work head of FIG. 1

The respective guide fingers 55 and 61 make sliding contact with the interior surface 52 at respective separate sliding contact faces 56 and 63. The surfaces 56 and 63 are smoothed to provide suitably low sliding friction when in contact with the interior surface 52. The surfaces 56 and 63 form the outer most portions of the guide fingers 55 and 61. The respective guide fingers 55 and 61 are formed with a respective space 59c and 61c between the contact surfaces 56 and 63 and the corresponding proximal body end 51 and distal body end 53. With reference to FIGS. 3, 4, and 5 in a rest position, i.e., when the work head 100 is not inserted in the tubular workpiece 42 (see FIG. 4) the fingers are relaxed and extend radially outward to a rest diameter 2Rr through the central axis 54, greater than the tubular workpiece 42 inner diameter 2Rc (i.e., Rr>Rc). When the work head 100 is inserted in the tubular workpiece 42, the fingers are compressed toward the central axis 54 and the contact surfaces 56 and 63 move inward as indicated by the dotted lines 55a' and 61a'. The void spaces 59c and 61c provide for the resilient guide fingers 55 and 61 to resiliently absorb small variations in the tubular workpiece 42 diameter 2Rc as the work head 100 is moved along therein keeping the body axis 54 essentially aligned with the tubular workpiece 42 axis 44.

The work head 100 moves slidably within the tubular workpiece 42 when drawn toward the pinch roller/motor assembly 58 by the umbilical tube 31 under tension applied by the pinch rollers 58a. The umbilical tube 31 has sufficient tensile strength to pull the work head 100 distally through the tube when the proximal guide fingers 55 and distal guide fingers 61 are in sliding contact with the interior surface 52 of the tube. The umbilical tube 31 contains the optical fiber 38 that transmits high power laser pulses 34 (not shown in FIG. 1) from the laser 32 under control of the controller 48 to the work head 100. The work head 100 contains a laser beam redirection module (a mirror assembly 380 described below) where the pulses are redirected to impinge on a surface material layer (not shown) overlaying the interior surface 52 of the tubular workpiece 42 (described in detail below). The work head 100 directs and distributes the laser pulses to treat the surface material layer thereon in the manner described in the previously filed patent application L007 and described further below.

With respect to FIG. 1A the preferred embodiment 10 also includes a enclosed end cap and light baffle (72) mounted on the tubular workpiece 42 beyond the proximal body end of the work head 100. The proximal end cap 72 includes a proximal vent 74 to allow incoming ambient air 76 to flow into the proximal end of the tube 42 and is configured of a material (a substantial thickness of metal and the like) impervious to laser energy from the laser 32, to prevent significant laser energy to escape the interior working volume Vn.

Additionally, a preferred embodiment includes a longitudinal exhaust flow/retractor tube assembly 82 (exhaust assembly) having a proximal refractor end 88 and an opposed coupling end 90. The exhaust assembly 82 defines an umbilical passageway 33 therein, aligned to the workpiece 42 tube along the central axis 44 and positioned between the distal tube end 50 and the pinch roller/motor assembly 58. One end of a lateral extending exhaust tube 86 forms an air tight TEE connection to the exhaust assembly 82, disposed between the opposed coupling ends 88 and 90.

The exhaust assembly end 88 is sealingly and removably coupled to the distal tube end 50 by a removable sealing coupler 87. The exhaust assembly end 90 is fixedly mounted on the roller assembly 58. The proximal end 88 may be sealed to the tube end 50 by an adhesive tape, or by more permanent pipe coupling means readily found in the art. The exhaust flow/retractor tube assembly 82, the exhaust end 88 and the end 90 are aligned with the axis 44 of the tubular workpiece 42 so the umbilical 31 passes slidably and sealingly through an air tight sealing aperture 96 of a distal aperture cap 94 closing the tube end 90. The sealing aperture 96 is configured to slidably and sealingly receive the umbilical 31 as it passes into frictional engagement with the pinch rollers 58a. The aperture 96 may be formed of tight fitting elastic, such as rubber sheet and the like. The umbilical tube 31 passes through the proximal coupling end 88, the umbilical tube 31 passage way, and out through the distal aperture 96 to the roller/motor assembly 58.

The lateral exhaust tube 86 feeds an exhaust blower 84 and associated filter assembly 85 and is joined by another coupler 87 there between. With respect to FIGS. 1B and 6 exhaust blower 84 provides a lowered pressure, Pe, in the lateral exhaust tube 86 which draws incoming ambient 76 air into the proximal air vent 74. The incoming ambient air is channeled into a cylindrical air stream 98 by the interior of the tube 52 and the workhead 100 that passes distally along the tubular workpiece 42 between the work head 100 and the interior surface 52. The proximal guide fingers 55 and distal guide fingers 61 are sized and spaced sufficiently far apart circumferentially around the body of the work head 100 so that the cylindrical air stream 98 can easily pass by.

The air stream 98 provides two advantages described further below: 1) it removes ablated detritus from the work area and 2) provides motive power for a rotating mirror 168 which (see below) directs the laser beam pulses to the work area. After passing distally by the tubular workpiece 42, the air stream 98 exits laterally 92 and enters the exhaust tube 86 where it is captured by the blower 84 and filter 82.

Referring to FIG. 1A and 1B and 2, the control signal cable 120 is defined in this document to identify any suitable means known in the art that transmits one or more types of electrical signal or energy such as a power signal, a data signal, a video data, and a status.

The laser control cable 122 allows the system controller 48 to check the status of the laser pulse generator 32 and to direct the laser pulse generator 32 to generate a laser input beam 34. The control signal cable electrically connects the laser pulse generator to the safety circuit 134, and allows the safety circuit 134 to inhibit the laser pulse generator from generating input beam 34 where the work head 100 is not in a safe operational state for an application of the input beam. The safety circuit 134 is electrically connected to a plurality of proximity sensors (also called safety interlock points 300, shown in FIG. 18 of prior application L007). A person having skill in the art of electromechanical interlocks will be able to adapt the interlocks shown in the prior application for suitable use with the present invention.

Figure 12:
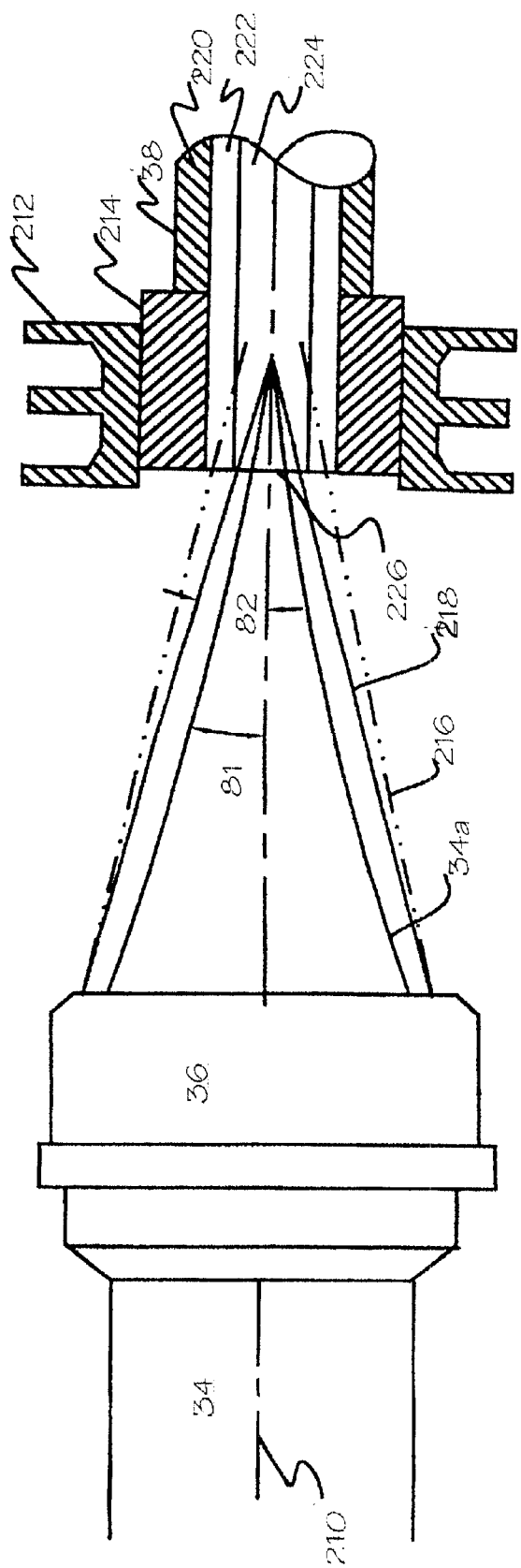
FIG. 12 (prior application FIG. 5) is a side view of a subsystem for inserting the input beam of FIG. 2 into an optic fiber waveguide for transfer over distance in accordance with the invention.
Figure 13:
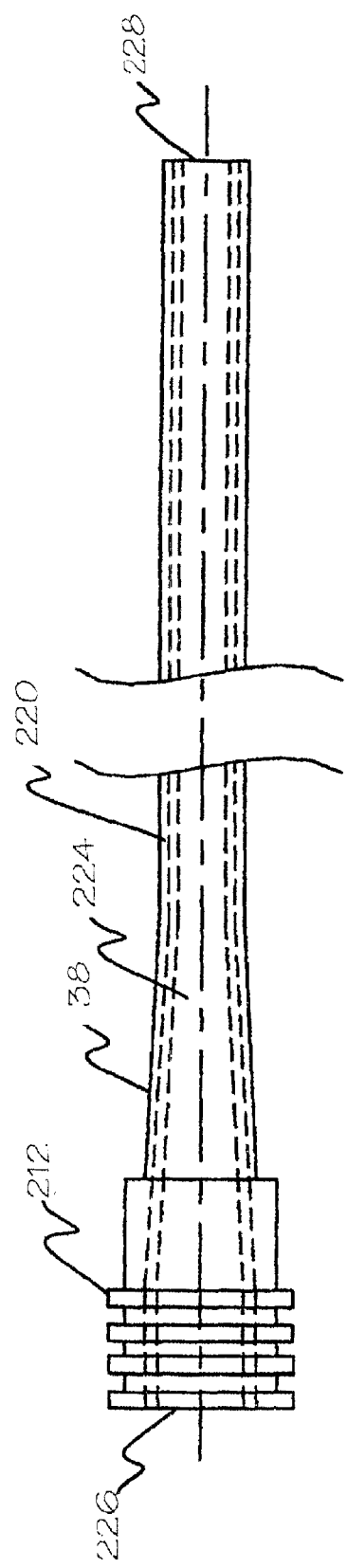
FIGS. 13 and 14 (prior application FIGS. 6a and 6b) are side views of fibers for transferring the input beam of FIG. 2 over a distance in accordance with respective embodiments of the invention.
Figure 14:
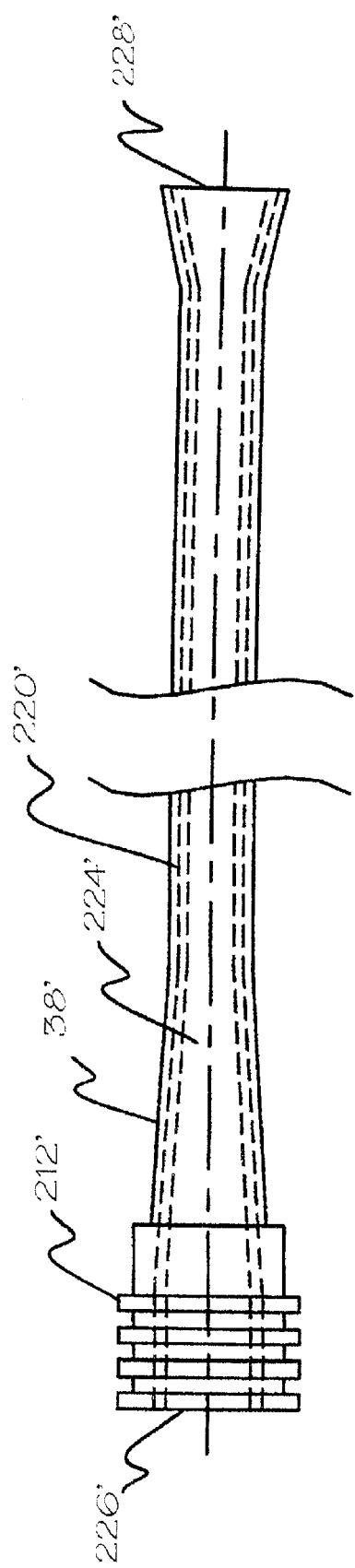
Figure 15:
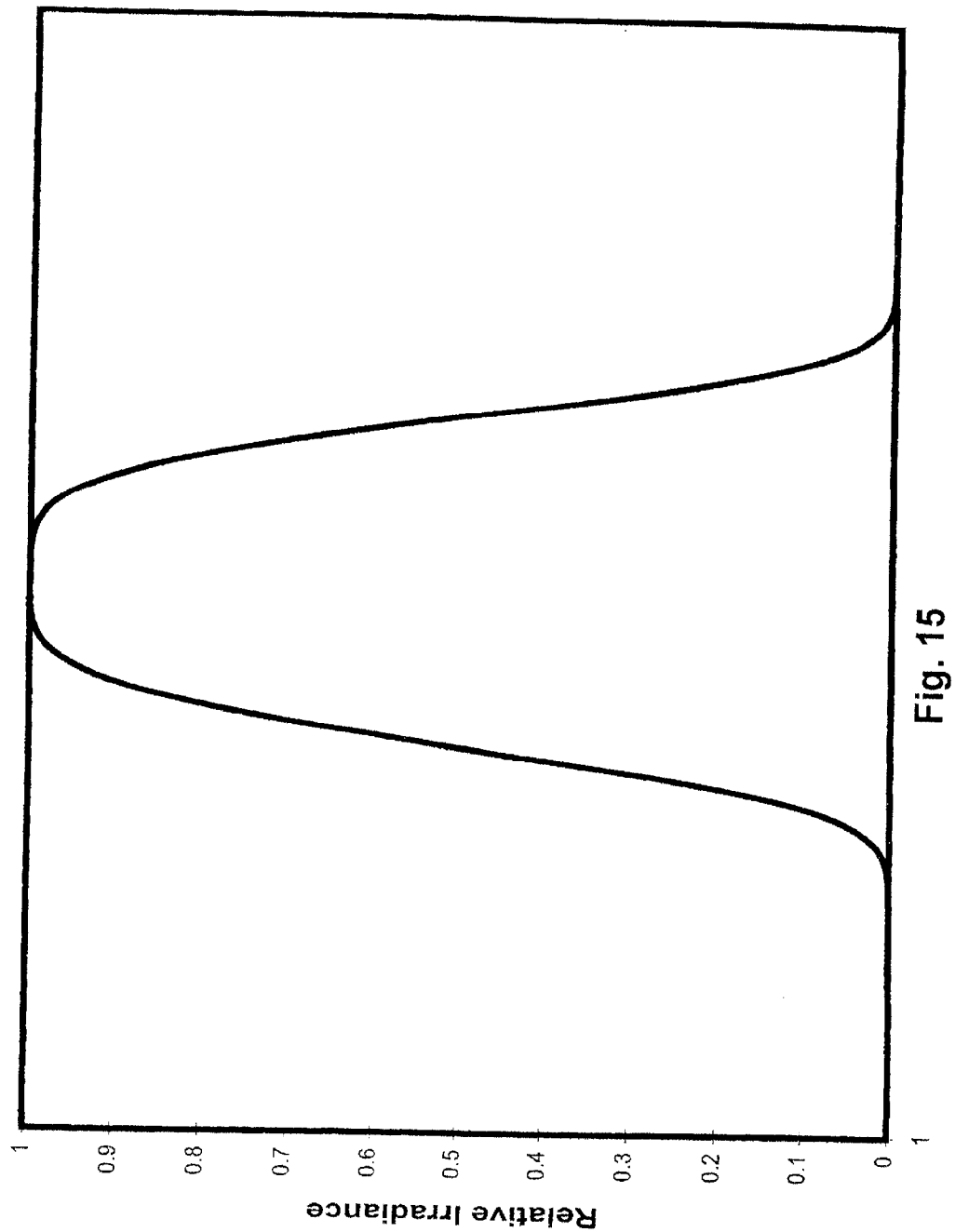
FIG. 15 (prior application FIG. 7 is an intensity profile for the input beam of FIG. 2 after fiber transfer over a distance ("output beam") in accordance with the invention.
Figure 16:
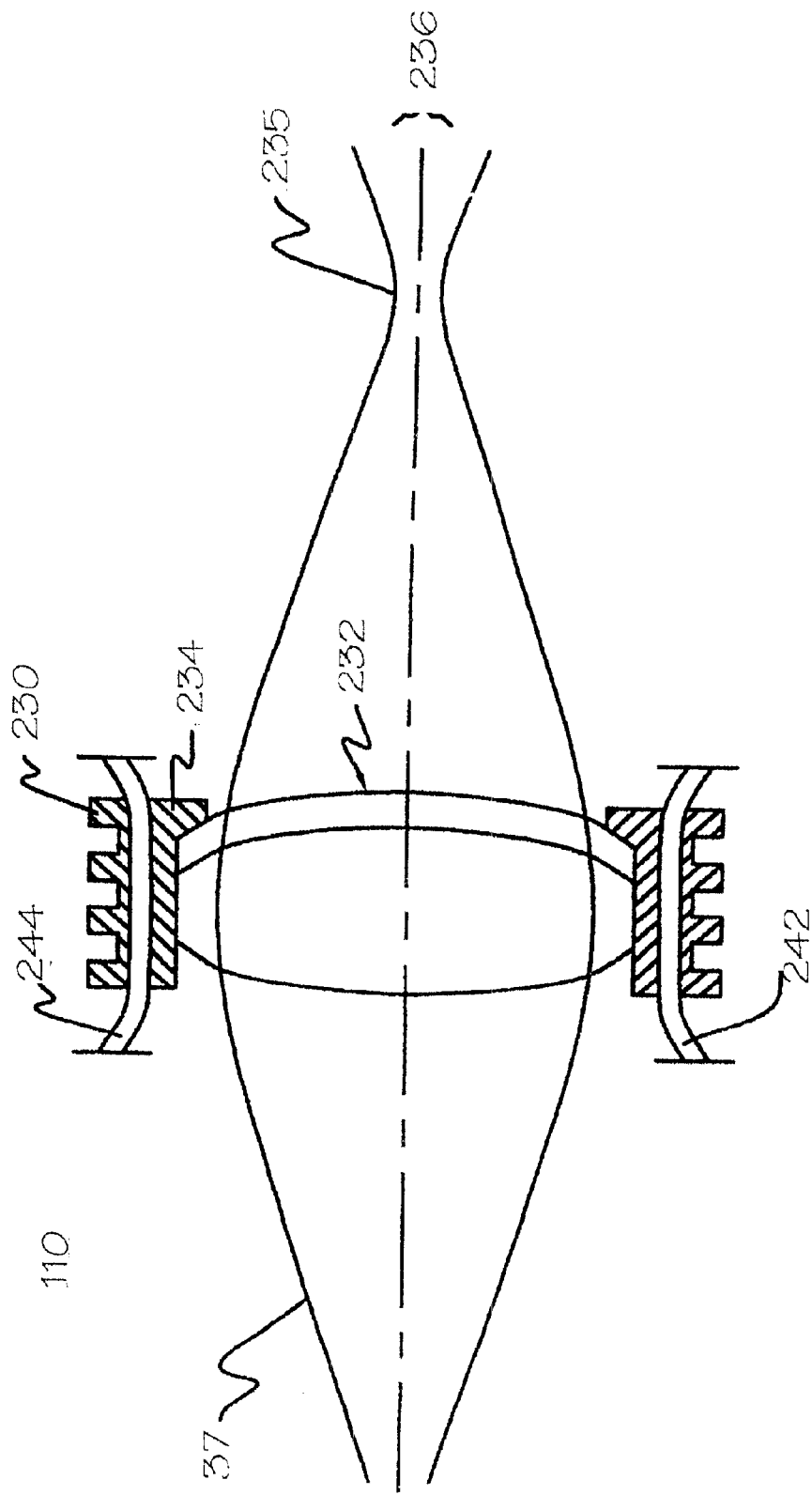
FIG. 16 (prior application FIG. 8) is a side view of an objective in accordance with the invention, incorporating a heat dissipation system, for focusing the output beam of FIG. 5.

With respect to FIGS. 1A, 3 and 12, the safety circuit 134 ensures the work head 100 is properly positioned in the tubular workpiece 42 so that an output beam 38 will not escape outside of a working volume bounded by the tubular workpiece 42, the end cap and light baffle 72, the distal aperture end cap 94 and the exhaust blower 84. When the safety circuit 134 indicates the existence of a safe operational state, the laser pulse generator 32 directs input beam 34, into a lens assembly 36. The lens assembly 36 collimates, focuses, and delivers the input beam into laser energy fiber optic 38, which in turn passes from the back end 30 through the umbilical tube 31 to work head 100. Upon reaching work head 100, output beam 37 exits laser energy fiber optic 38 in the direction of a lens assembly and mirror member described below.

The chiller 40 refrigerates a coolant which circulates to and from the laser pulse generator via a back end coolant transport tube 46. This provision of the coolant to the laser pulse generator maintains the laser pulse generator in a functional state by absorbing excess heat energy created by the laser pulse generator during the generation of the input beam.

With respect to FIG. 2, an alternative embodiment of system 10 may use an inert purge gas source 76 such as a bottle of $N_2$ 76 connected to the baffle vent 72, connected to the tubular workpiece 42 forces a substantially inert gas (an "air knife" e.g., nitrogen) in place of the ambient air 76, across the surface being ablated to sweep detritus away from the beam and into the evacuation system.

With respect to FIGS. 1B, 3 and 4, the difference between the diameter 2Rr of the contact surfaces 56 and 63 in the relaxed or rest position shown in FIG. 4, and the inside diameter 2Rc of the workpiece is preferably set so that axial friction force between the contact surfaces 56 and 63 and the inside surface 52 is small enough to allow the work head 100 to be pulled from the tubular workpiece 42 by applying reasonable withdrawal tension indicated by the arrow marked T on the umbilical 31, exerted by the pinch rollers 58a, but large enough to prevent the airstream 98 from pushing the work head out of the tubular workpiece 42.

The contact surfaces 56 and 63 also preferably have enough circumferential friction force (not shown) to keep the fingers 55 and 61 from rotating the tube 42.

The cylindrical air stream 98 provides a means for carrying away waste reaction products of the interaction of surface material layer with the pulse laser beam (described further below). The cylindrical air stream 98 continues to flow distally toward the low pressure provided by the exhaust blower 84. The cylindrical air stream 98 flows further distally beyond the work head 100 and is pulled into the exhaust blower 84 where it is filtered to remove the waste reaction products before being exhausted to the ambient.

The distal aperture end cap 94 has an umbilical sealing aperture 96 sized and fitted to slidingly seal the umbilical tube 31 passing there through. The distal aperture end cap also provides an gas tight seal with the distal end of the exhaust 82 to keep the reaction products from entering into the ambient air by the umbilical tube 31 passing there through.

Figure 9:
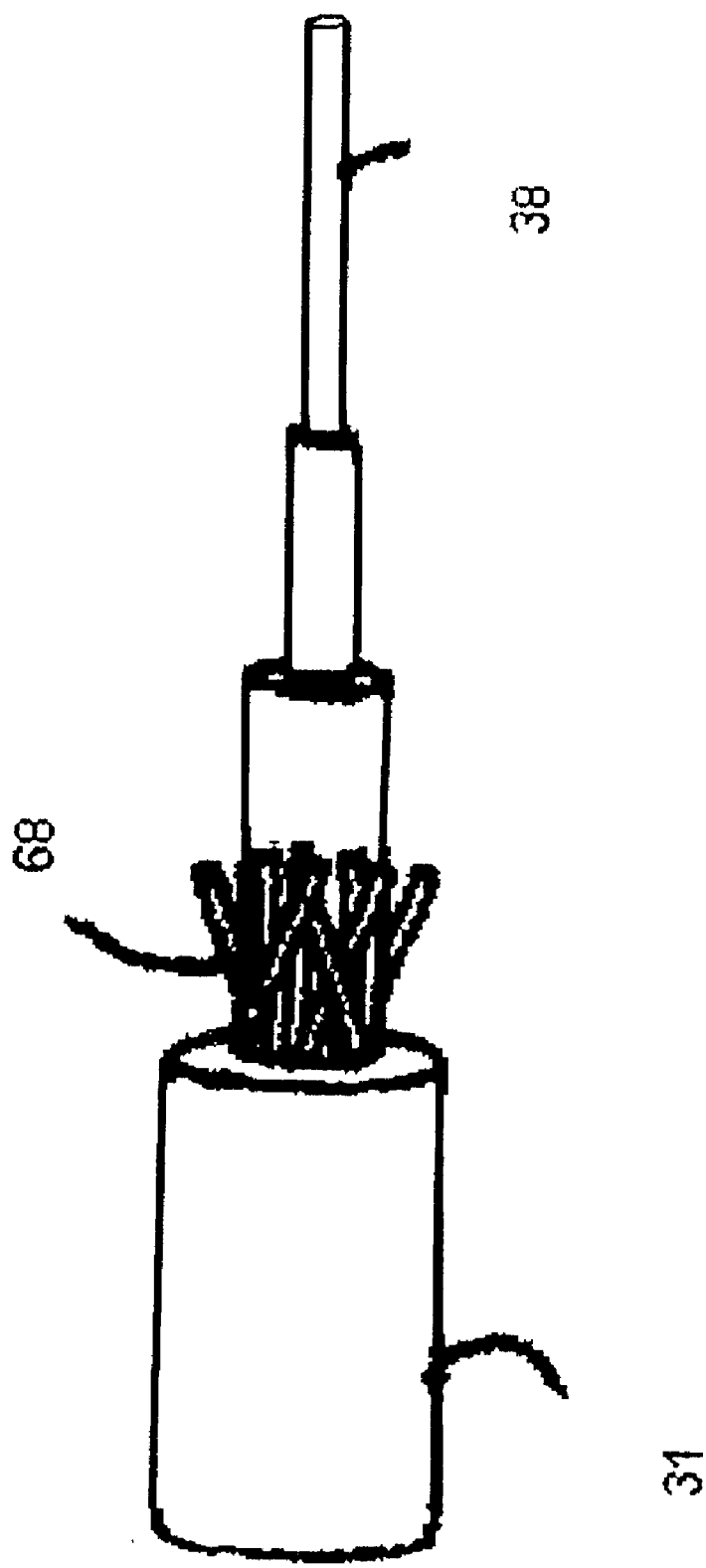
FIG. 9 is an example of a dual jacketed Fiber Optic cable with built-in strain relief strands used for the conduit of FIG. 1.
Figure 10:
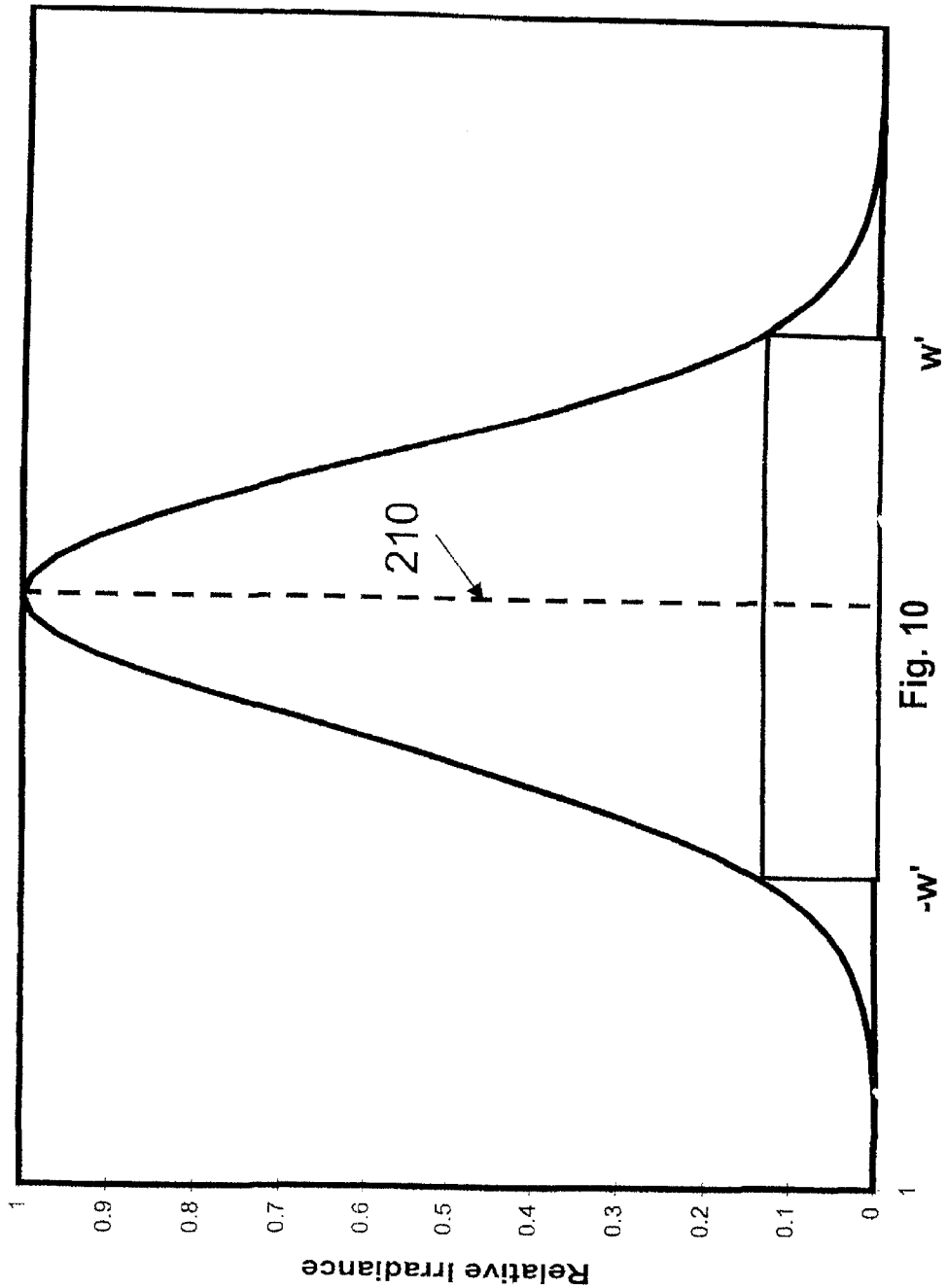
FIG. 10 (prior application FIG. 3) shows a TEMOO Gaussian intensity profile for a quality beam of coherent electromagnetic radiation ("input beam") emitted from a low power laser.

Referring to FIG. 2, and FIG. 9 there is shown in a cut away exploded view, a schematic representation of the distal end of the umbilical tube 31 connecting with the back end system 30. The back end system 30 may include bulky and heavy components of the LAS. Other components such as those sensitive to vibration, dust, and radiation may also be included in back end system 30. While the specific components within the back end system 30 may vary according to specific implementations of the invention, an illustrative embodiment may contain a system controller, a high power laser pulse generator 23, an electrical power source 78, an exhaust blower 84, an exhaust filter 82, a first anchor 66, and a chiller 40.

In a preferred embodiment of the present invention shown in FIG. 2, a strain relief member 68 is comprised of a length or lengths of strong material such as a metal or a plastic strand 68 (FIG. 9) or other suitable material known in the art, and is preferably shorter than other members (e.g. fiber 38) contained within the umbilical tube 31. Umbilical tube 31 provides a protected envelope including various components including the strain relief member 68, and the laser energy optical fiber 38. One preferred laser source 32 is a Q switched Nd:YAG laser. A preferred optical fiber 38 for YAG lasers is silica core/silica clad step index laser fiber. The strain relief member 68 is anchored distally to the back end system 30 at a first anchor 66. The strain relief member 68 is anchored to the distal end of the work head 100 by standard SMA threaded connector 65. The shorter length of the strain relief member 68 and the anchoring of the strain relief member to the back end system 30 and the work head 100 serve to protect the laser energy optical fiber 38 from damage due to applied tension or stretching.

Detailed Description of the Work Head 100

With regard to FIG. 3, FIG. 4 and FIG. 5 the respective guide fingers 55 and 61 are affixed to and supported by respective integral ring-like guide collars 57 and 62 collars 57 and 62 circumferentially surround respective proximal barrel portion 351 and distal body tube 151 of corresponding proximal body end 51 and distal body end 53, The guide collar 57 has a coaxial collar inner cylindrical face 356. Collar 57 is affixed to an outer race 358 of a miniature front end bearing 360 with the collar inner face 356 press fit there between. The outer race 358 of bearing 360 is pressed distally into the collar 57 until reaching a distally disposed proximal step 362 of guide collar 57. The proximal step 362 projects radially inward from the inner face 356 enough to capture the outer race 358 while remaining clear of the front barrel 351 protruding axially there through.

A bearing retention ring 366 is radially sized and press fit over the front barrel 351 protruding axially through the collar 59. The front barrel 351 is provided with a proximally facing coaxial inward step 364 aligned with the collar step 362 to receive an inner race 368 of the bearing 360. The step 364 radial extent is limited to avoid interference with outer race 356.

The front bearing 360 thus allows the front barrel 351 and rotatable mirror assembly tube 370 to turn freely within the collar 37 when the fingers 55 are in axially slidable contact with the interior surface 52 and the work head 100 is in operation. Rotatable front barrel 351 is proximally aligned and rotatably integral with distal rotatable tube 370 about the body axis 54.

A coaxial integral mirror assembly tube 372 is disposed between barrel 351 and tube 370. Circumferentially parallel, axially spaced apart arc segments 374a and 374b on the mirror assembly tube 372 define a laser beam aperture 374 there through.

Referring again to FIG. 3 and FIG. 5, aperture 374 is radially and circumferentially sized and positioned to pass reflected laser beam 39 therethrough. Optical fiber 38 directs laser beam 37 exits optical fiber 38 along the body axis 54 and passes through protective window 114. The window 114 is spaced proximally away from the fiber exit face 38' to allow for the natural divergence of the beam 37 and subsequent decrease of laser power density. The exit beam 37 is recollimated and focused by lens assembly 520. Lens assembly 520 is composed of respective proximal and distal doublets 522 and 524 separated by ring shaped spacer 526. Lens assembly 520 is corrected for spherical aberration and includes anti-reflective coatings to reduce optical losses.

With respect to FIG. 3, laser exit beam 37 is directed by lens assembly 520 proximally toward mirror assembly 380. Mirror surface 168 is oriented 45° from the body axis 54 to direct exit beam 37 as converging reflected beam 39 at right angles to the work head 100. The reflected beam 39 exits the work head 100 through the laser beam aperture 374. Laser beam aperture 374 is sized and disposed to pass the reflected beam 39 to focus on the inner surface 52 of the tubular workpiece 42, i.e., the focal plane defined by the lens assembly 520 in combination with the optical laser fiber 38, exit face 38' and the mirror assembly 380.

With regard to FIG. 3 and FIG. 5, spacing L1, of the fiber exit face 38' and the mirror face 168 is defined by a threaded rod 382, mirror base 384, mirror body 386, coil spring 388, and tension nut 391 in combination with the mirror assembly tube 372. Mirror assembly tube 372 forms an internal coaxial mirror assembly bore 371. Mirror assembly bore 371 slidingly receives mirror assembly 380 therein. The bore 371 ends proximally with a circular face 390. The circular face 390 is centered on and perpendicular to the body axis 54 and positioned proximally to the mirror assembly 380. The face 390 is configured to abuttedly receive a proximal end of the coil spring 388. The coil spring 388 is resiliently compressed toward the face 390 by a distal end of the coil spring 388 abutting to a proximal face 385 of mirror base 384. The mirror base 384 is drawn proximally toward the spring face 390, compressing the spring 388, by a distal end of the threaded rod 382 which is threadably engaged with the tension nut 391.

Barrel 351 forms coaxial smooth bore 352 there through. Smooth bore 352 is sized to slidably receive distal end of threaded rod 382 there through. The distal end of threaded rod 382 extends through the coaxial bore 352 and is fixedly mounted in a proximal facing end recess 354 formed in the proximal face 385. The distal end of threaded rod 382 may be soldered, glued, welded or joined by any other suitable joining methods into the recess 352. The rod 382 engages proximally with the threaded tension nut 391. The nut 391 may be turned clockwise or counter counterclockwise causing the rod 382 to move along the axis 54 proximally away from or distally toward the barrel 351. Axial movement of the rod 382 adjusts axial spacing L1 between mirror base 384 and the mirror 168 mounted thereon, along the axis 54 from the fiber optic exit face 38'. Adjusting L1 allows the laser beam exit face 38' to be imaged on the work piece interior surface 52, i.e., the focal plane 166 of a lens system 520 and mirror assembly 380.

A longitudinal pin 387 is embedded in the mirror base 384 and projects radially outward therefrom.

A key slot 389 is formed in the mirror assembly tube 372 there through. The slot 389 is disposed adjacent to the longitudinal pin 387 and dimensioned to receive the pin 387 there through. The slot 389 is dimensioned to extend proximally and distally from the mirror base 384 end face 385 a slot 389 distance sufficient to allow the slot pin 387 to slide axially within the slot as the mirror base is moved toward or away from the lens assembly by the rod 382. The pin 387 and slot 389 are laterally dimensioned to be in axial sliding contact, and thereby prevent the mirror assembly from rotating with respect to the tube 372. Thus the mirror assembly 380 will be driven by the pin 387 in the slot 389 to rotate in accordance with the tube 372 and aperture 374.

Lens Assembly

The rotatable tube 370 is formed with internal coaxial bore 375 for fittingly receiving and coaxially fixing the lens assembly 520 there within. The bore 375 has coaxial lens retaining shoulder 373 proximal to and facing the lens assembly 520. The shoulder 375 steps radially inward and abuts lens assembly 520 proximally. The shoulder 373 is disposed between the lens assembly 520 and the mirror assembly 380. The lens assembly 520 is positioned centrally within the bore 375 between the fiber exit face 38' and the angled mirror face 168, to focus reflected laser beam 39 from the mirror face 168 on the interior surface 52. The lens assembly 520 includes the two doublet lenses 522 and 524 spaced apart by tubular lens spacer 526 coaxially aligned with the body axis 54. The lens assembly 520 is fixedly held with a proximal end abutting against the shoulder 373. The lens assembly 520 is held against the shoulder 373 by a proximal end of distally disposed coaxial lens retainer sleeve 528. The proximal end of retaining sleeve 528 fixedly abuts a distal end of the lens assembly 520. The coaxial lens retainer sleeve 528 is circumferentially sized to fit closely within the bore 375 and be joined circumferentially thereto by an adhesive layer there between (not shown). Sleeve 528 may alternatively be sized to be press fit into bore 375. The joining of sleeve 528 and bore 375 sets the sleeve 528 in fixed axial relationship with the tube 370.

Propeller

A propeller assembly 500 is positioned coaxially with the body axis 54 outside the lens assembly 520. The propeller assembly 500 includes a tubular body cylinder 530 having proximal and distal rim ends spaced axially apart and defining a coaxial bore 532 there through. The tube 370 is formed with a cylindrical outer surface 376 for mounting the propeller assembly 500 thereon. The cylindrical outer surface 376 is spaced radially inward away from the interior surface 52 and is coaxial with the body axis 54. The coaxial bore 532 is fixedly joined to the surface 376 by a press fit or adhesive (not shown). Joining the coaxial bore 532 and outer surface 376 fixes the propeller assembly 500 to the rotatable tube 370. The cylindrical surface 376 is adjacent to and spaced radially outside the lens retaining bore 375 and lens assembly 520.

The body cylinder 530 also has an axially tapered vane mounting outer surface 534. The outer surface 534 tapers radially outward distally in the direction of body axis 54. The proximal rim end of cylinder 530 is radially narrower than the distal rim end of cylinder 530. The distal rim end of the outer surface 534 joins smoothly into a distally disposed outer surface 377 of the tube 370. The surface 377 is coaxial with the body axis 54 and extends to a distal end 379 of the tube 370. The distal rim end of the propeller body cylinder 522 and the outer tube surface 377 are spaced inward from the interior tube surface 52 sufficient to allow air stream 98 to pass freely there through.

Eight identical vane segments 536 are affixed in equally spaced circumferential relationship around the vane mounting surface 526. The vane segments 528 are molded integral with the cylinder 522 and are spaced circumferentially apart sufficient to provide for the air stream 98 to pass distally between. The vane segments 528 extend radially outward from the body 522 to rotatably clear the interior surface 52 of the tubular workpiece 42. The vane segments 528 extend axially between the proximal and distal ends of the body cylinder 522 and are angled from more than zero to less than 90° with respect to the body axis 54 so that the air stream 98 will impart sufficient rotational torque thereto to cause the joined propeller assembly 500 and rotatable tube 370 to rotate around the body axis 54.

Rotatable Tube Bearings Assembly

The rotatable tube 370 defines an internal bearing assembly bore 378 coaxially adjacent to and spaced radially inward from the outer tube surface 377. The tube 370 is rotatably mounted on a bearing assembly 540 disposed within the bearing assembly bore 378. The bearing assembly 540 is comprised of a proximal front bearing 542 and a distal rear bearing 544 coaxial to the body axis 54. The bearings 542 and 544 are miniature roller ball bearings having respective coaxial adjacent and spaced apart inner and outer races that freely rotate independently about their respective axes. The bearings 542 and 544 abut oppositely to and are spaced apart by a thin cylindrical bearing spacer sleeve 543 axially aligned thereto and abutting to the respective inner races there between. The bearing spacer sleeve 543 has an axial length sufficient to keep the tubular workpiece 42 head end 51 and distal body tube 151 centered on the body axis 54 when the tube 370 is in rotational operation. The cylinder spacer sleeve 543 is sufficiently strong to maintain the spacing between the bearings 542 and 544 under compression therefrom. The cylinder spacer sleeve 543 is sufficiently thin to avoid interference with the outer races of the bearings 542 and 544.

The bore 378 is coaxial to and spaced from the body axis 54 to slidingly receive the outer races of bearing 542 and 544 in contact therewith. A distal facing shoulder 545 is formed between the lens retaining bore 375 and the bearing assembly bore 378. The front bearing 542 abuts proximally to the shoulder 545 to hold the bearing assembly 540 fixedly thereat. The shoulder 545 is coaxial to the body axis 54 and steps inward from the bore 378 to bore 375 sufficient to provide the proximal abutting relationship to the bearing 542 outer race without interfering with the bearing 542 inner race.

A flanged cylindrical end sleeve 550 having an inner bore 552, proximal end 554, distal end 556 and outer threads 558 is coaxial with the body axis 54 and is threadably disposed in corresponding inner threads 558' at the distal end 379 of the bore 378. The end sleeve 550 is threaded into the distal tube end 379 so that the proximal sleeve end 554 bears proximally on the bearing 544 outer race. The proximal sleeve end compressively holds the bearing assembly 540 in proximal abutting contact with the shoulder 545.

Ferrule and Optical Fiber End

The inner bore 552 of the end sleeve 550 is radially spaced away from the distal body tube 151 that projects there through and is rotatably free thereabout. The body tube 151 coaxially contains an extended SMA ferrule 572 there through. The extended ferrule 572 is part of an other wise standard high power SMA optical connector 590. The extended ferrule 572 has a distal end to proximal end length reaching from the SMA connection 65 to be aligned axially with the mounting shoulder 545. A suitable extended ferrule SMA connector may be obtained from commercial vendors manufacturing PTC series Fiber Optic Cables or their equivalent and are well known in the art. Coaxially centered within the ferrule 572 is the optical fiber 38 embedded therein.

The rotatable tube 370 thus is free to rotate about the body axis 54 along with the end sleeve 550, the outer races of bearings 544 and 542, the lens assembly 520, the mirror assembly tube 372, and the mirror assembly 380, and the propeller assembly 500, while the guide fingers 55 and 63, body tube 151, optical fiber 38 and the bearing inner races 542, 544 remain still.

Laser Beam Deflection/Reflection and Impingement

Figure 6:
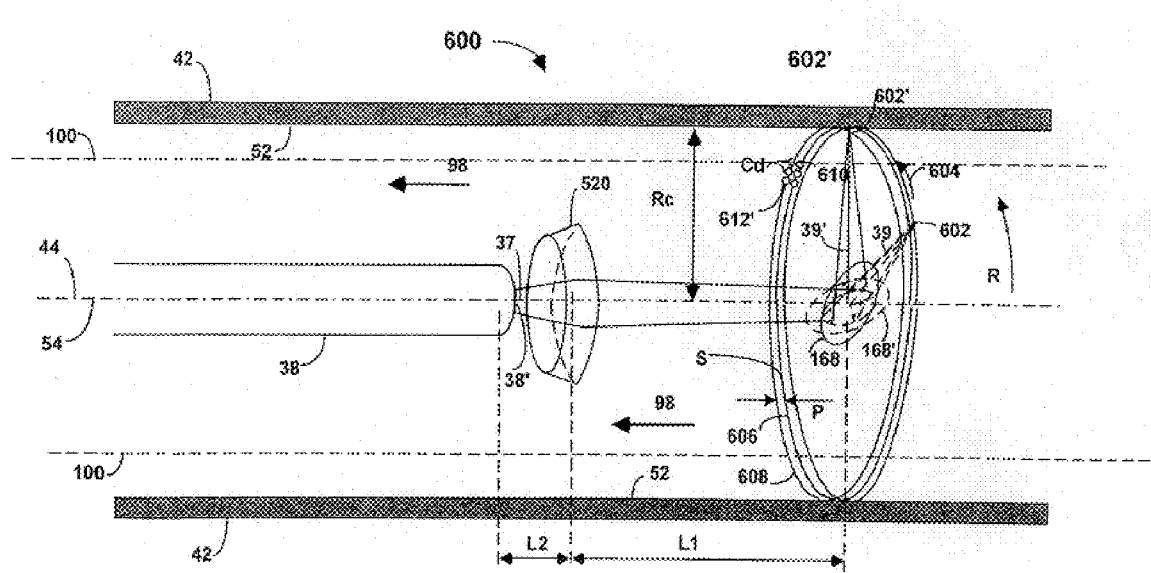
FIG. 6 is a elevation perspective view of a post-objective rotating mirror scanning system for focusing and then scanning the output beam of FIG. 6 inside the workpiece tube of FIG. 6, in accordance with an embodiment of the invention.

With reference to FIG. 6 in combination with FIG. 3 and FIG. 5, a preferred embodiment of the laser beam directing means of the present invention is shown. FIG. 6 shows a partially cut away schematic side view 600 of a portion of the work head 100 (indicated by heavy dotted lines) of the present invention inserted in the workpiece 42. The fiber optic 38 delivers diverging laser exit beam 37 directed proximally from the exit face 38'. The laser beam 37 is recollimated and focused by the lens assembly 520 toward the angled mirror face 168 exit beam 37 is reflected therefrom as converging beam 39 and directed radially outward toward the work surface 52. The spacing L1 between exit face 38' and mirror 168 is adjusted by the rod 382 and nut 391 as described above with reference to FIG. 3. L1 is adjusted to compensate for the axial spacing, L2, between the exit face 38' and the lens assembly 520 and the radial spacing, Rc, between the central axis 44 and the interior work surface 52. The refocused beam 39 is reflected from mirror position 168 and focused to impingement point 602 on the work surface 52.

At another rotary position of the mirror 168' the refocused beam 39' is focused at impingement point 602' on the path 604.

If the work head 100 is axially stationary, e.g., fixed in place by some means, and the mirror is rotated in the direction shown by arrow R, (e.g., by air stream 98 impelling propeller 500 of FIG. 5) the points 602, 602', on path 604 will describe a circle on the inside of work surface 52. In this case the air stream 98 would take away reaction products of the laser pulses 39 impinging on the points 602 until there was no more material to be removed. This could be used as a mode of ensuring complete cleansing, if the air stream 98 was monitored until an acceptably low level of reaction products was measured by analysis means known in the art, such as spectroscopic analysis, flame color, and the like. Once the reaction product level was satisfactorily low, the work head 100 could be moved distally by an incremental distance and the process repeated until a satisfactory result was obtained.

Another method more preferable for some uses, is to calculate the minimum pulse spacing, Cd, between adjacent points 602, 602' needed to remove or treat the surface material, then to arrange for the air stream 98, to be such that sequential laser pulses on path 604 are circumferentially spaced apart no more than spacing Cd. Additionally one can arrange the work head 100 axial speed, indicated by arrow S such that the pitch of adjacent spirals 610, 612 is no more than Cd.

Figure 11:
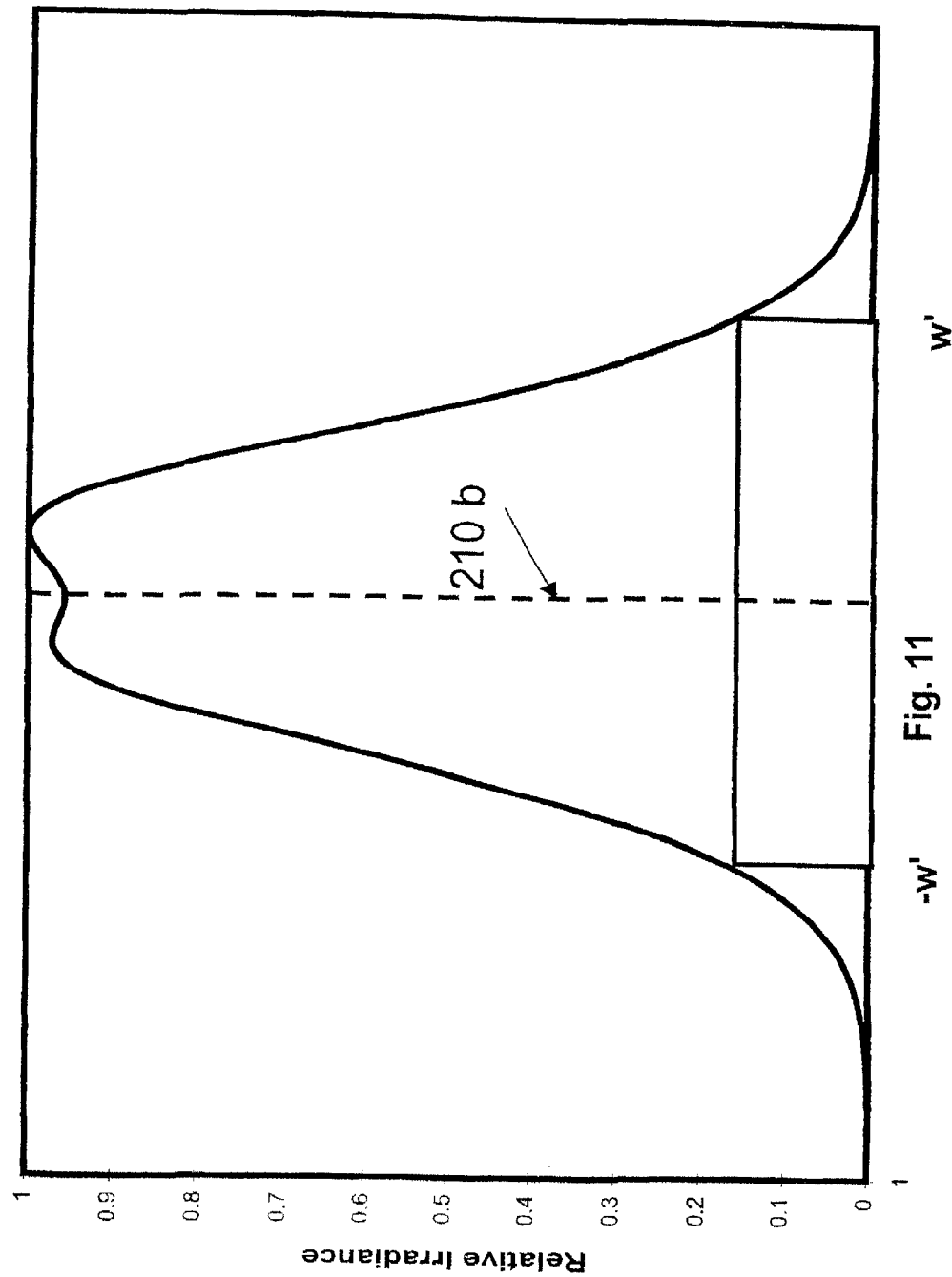
FIG. 11 (prior application FIG. 4) is a typical intensity profile for a beam of coherent electromagnetic radiation ("input beam") emitted from a medium to high power laser.

With regard to FIG. 7 and FIG. 8, (copies of FIGS. 11 and 12 of previously filed application L007) are shown in which reference numbers refer to the description therein. FIG. 7 is an laser spot intensity profile of one circle 604 or one spiral turn 610, 612 along the constant radius of the work surface 52. A intensity profiles 250a and 250b of adjacent pulses in the same path (circle 604, or spiral turn 610, 612 of FIG. 6) overlap if the speed of rotation R and the speed, S, of moving the work head 100 are properly chosen, i.e., adjacent pulses 205a, 205b overlap at about ⅔ of maximum intensity.

To provide uniform treatment across a work surface 52, given individual pulse profiles 250a, 250b the speed R and S should be controlled to overlap about two-thirds up the profile height of pulse 250a to minimize spots of over treatment ("hot spots") and spots of under treatment ("umbras"). Overlap region 252 is termed "penumbra" in this application. FIG. 8 (Prior FIG. 12) is a face-on view of the pattern from adjacent pulses of beam 39 in both circumferential direction (indicated by arrow R) and axial directions (indicated by arrow S) in a carefully controlled rotating and moving embodiment of this invention.

The work head 100 is cooled by the cylindrical air stream 98 as the air stream 98 passes by the work head body 100 as urged by exhaust 82. Since the thickness and mass of surface material found on the inside of tubes and pipes such as the tubular workpiece 42 is generally small, the power required for removing such material is lower than that for bulk cleaning of heavy coatings such as paint and the like. Thus cooling provided by the cylindrical air stream 98 is sufficient.

Optionally, an inert gas 77, stored in an inert gas source 74, may be released into the end cap and light baffle 72, to be drawn into the proximal end of the tubular workpiece 42 and displace the incoming ambient. Inert gas 77 may replace air stream 98, and operate as an air knife, sweeping detritus away from the path of focused output beam 39 and toward exhaust blower 84. Delivery of inert gas 77 reduces the degree of oxidation damage to work surface 52 as it is exposed during treatment by flushing away oxygen from the working volume.

Electrical power is delivered via power cable 80 from electrical power source 78. The power cable 80 delivers power to the safety circuit 134, laser 32 and the chiller 80. The exhaust tube 86 transports work surface contaminant 162 as it is ablated from the work surface 52 into the cylindrical air stream 98. The stream 98 flushes the contaminate 162 distally along the work head body inside the tubular workpiece 42 to the lateral exhaust tube 86 and distally to filter/blower 84, 85. The blower 84 creates the low pressure condition Pe in the exhaust tube 86 that suctions ablated contaminate 162 out of the working volume Vw and into the exhaust tube 86.

Figure 17:
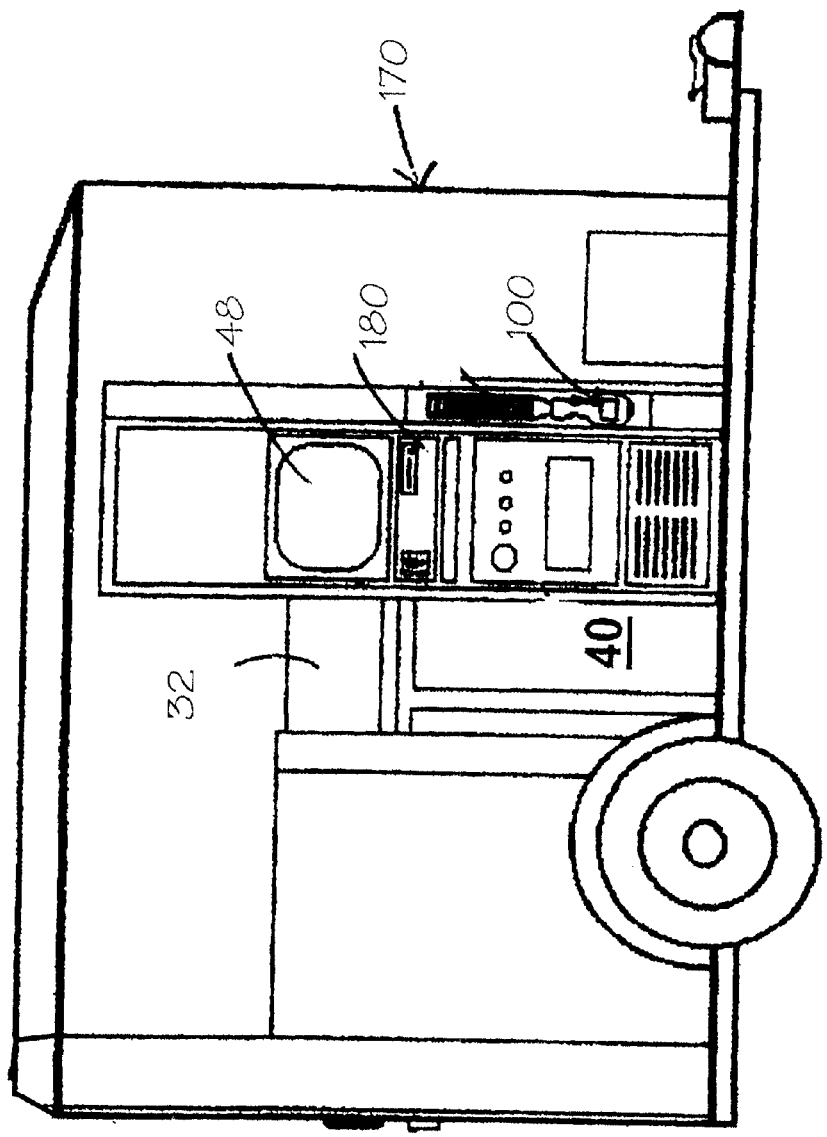
FIGS. 17 and 18 are starboard and port side views, respectively, of a trailer with sides removed showing how the invention may be stowed for transportation to a worksite.
Figure 18:
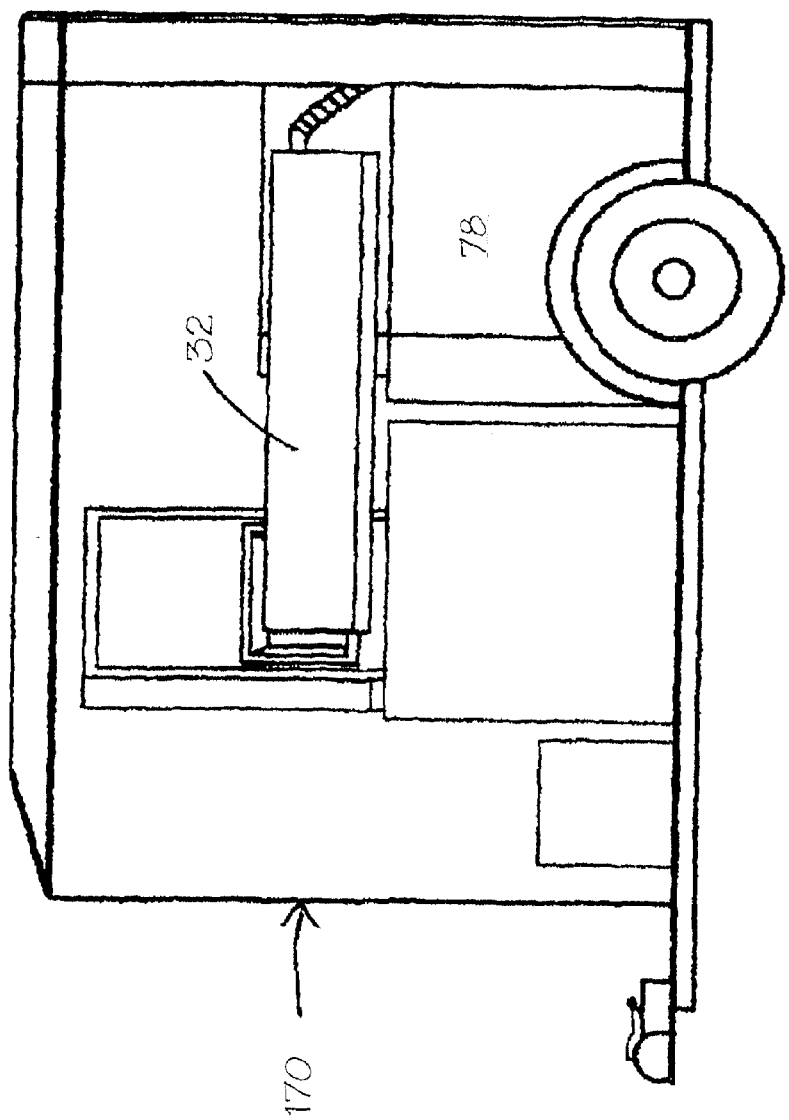

Referring now to FIG. 17 and FIG. 18 and page 14 of the pending application L007 incorporated herein by reference, a trailer 170 housing the back end 30 of the present ILAS invention is presented. The trailer is one example of a means of transporting the back end 30. Numerous other conveyances (e.g. trucks, rail cars, air and watercraft, etc.) are known in the art and are suitable for housing the system 10. Indeed, for some applications, the system 10 may be fixed at a location and the work piece 42 transported to the system 10. The laser pulse generator 32, the chiller 40, the controller 48 and the electrical power source 78 may be installed within the trailer 170. The umbilical tube 31, the work head 100 may be stowed at a travel position 180 within the trailer 170 or other conveyance. The umbilical tube 31 remains attached to both the back end system 30 and the work head umbilical connector base 151. The umbilical tube 31 is stored for travel in an unextended and retracted position.

The trailer 170 houses, supports and makes the system 10 mobile. At a work site, the work head 100 may be retrieved from the traveling position and the umbilical tube 31 extended so that the work head 100 may treat the tubular workpiece 42 at a distance sufficient to prevent work surface contaminate 162 from contaminating back end 30.

The laser pulse generator is preferably an industrial laser capable of pulsed operation and is also preferably a CO, or a Q switched Nd:YAG laser. The preferred wavelength of electromagnetic radiation output from laser pulse generator depends on the material to be treated. For many applications, a laser outputting infrared radiation is preferred. Infrared radiation heats many types of work surface contamination until they boil off an underlying substrate. An ultraviolet laser beam can decontaminate a surface by breaking molecular bonds of unwanted surface material. In still other applications, visible light laser radiation is appropriate (e.g., dark color materials such as black paint will absorb visible light radiation and boil off more readily than white paint). Lasers each emitting a different wavelength, more than one laser of the same wavelength, or various combinations of lasers of various wavelengths may be combined in a system either by interleaving pulses of radiation or by providing more than one laser beam fiber optic transport in the LAS. An example of a task in which combining lasers of different wavelengths is where it is desired to break molecular bonds of a contaminate and then boil it off a substrate.

The power output of laser pulse generator may be as low as five to ten watts for a low power system, useful for fine and detailed surface treatments and ablation, to as great as hundreds of kilowatts in a high power system. High power embodiments are useful for high-speed treatment of large diameter pipes, having large area surfaces. For such large scale applications, suitable scaling of the dimensions of the work head 100, the laser 32, waste disposal means exhaust blower 84 and cooling methods may be employed.

The following discussion is presented in pending 'L007, pages 16–18 and is incorporated herein by reference. This portion is repeated here italicized for convenience. Reference is made to the prior application figure numbers, which are attached as exhibits with both original and new figure numbers for reference and applies to the present invention.

DISCUSSION FROM PRIOR APPLICATION L007 BEGINS

*The power output of laser 32 may be as low as five to ten watts for a low power system, useful for fine and detailed surface treatments and ablation, to as great as hundreds of kilowatts in a high power system. High power embodiments are useful for high-speed treatment of large area surfaces. Preferably, the output of the laser 32, input beam 34, is a high quality (i.e., highly collimated, highly coherent, and diffraction limited) TEM00 Gaussian profile beam (FIG. 3). The higher the quality of the input beam 34, the less complicated objectives 36 and 110 need to be. For a laser system with a power rating more than a few tens of watts, TEM00 output is generally expensive or impractical So where a situation requires an embodiment of 10 this invention incorporating such a higher power laser, the beam intensity profile will more likely resemble FIG. 4. The total area under the curve of FIG. 3 and FIG. 4 represent the total electromagnetic radiation energy output of a laser system. The goal of the LAS is to impinge as much of this energy "as is practical" upon a optic fiber face for transfer from the back end 30 through the 15 umbilical tube 88 continuing through work head 100 systems and eventually to work surface contaminate 162. In the art, the phrase as much "as is practical" is generally taken to mean about 86.5 percent of the area under the curve. In FIG. 3 this area is noted as the area under the curve extending from −w to w; in FIG. 4 it is approximately from −w' to w' Distances w, −w, w' and −w' are defined as their distances from center line 210a and center line 210b 20 respectively. FIG. 5 shows the insertion of laser input beam 34 into laser energy fiber optic 38 which includes a core 224, cladding 222, and jacket 220. An input beam 34, with centerline 210, enters lens assembly 36 from the left. The lens assembly 36 collimates and focuses input beam 34 into input laser beam 34a. The working input laser beam 34a cross section is defined by angle a1 from centerline 210. Angle 01 is chosen to be smaller than the cross section of core 224 of first face 226 of fiber optic 38. Angle 02 defines a cross section, which includes the working input laser beam 34a, and light spillage, which could damage the cladding of fiber optic 38. Thus radiation within a radius of angle 02 should impinge on the core 224 of first face 226. The approximate limit of beam spillage 216 may extend out to the cladding 222. The described alignment avoids damaging the face of the fiber optic 38. Additional precautions include protecting jacket 220 by ferrule 214 and dissipating heat by sink 212. As mentioned above, radiation slams into face 226 with some of it re-radiating as non-usable heat. A fiber optic body of a given diameter could carry about 10 times the amount of laser radiation that can be inserted past a face of the same diameter. A solution, shown in FIG. 6a, is to have a face with ten times (slightly more than three times the radius) 15 the cross section area of the body of the fiber. For example, a fiber with a body about 50 u meters in radius should have a face about 150 u meters in radius to be efficient. The fiber optic 38 must taper from the face 226 to its body in order to accommodate the differing radii. The length of the input taper from face 226 to the body of the fiber may as long as 2 to 2.5 meters. In cases of particularly energetic lasers, an output taper, shown in FIG. 6b, may also 20 be necessary. The length of the output taper may be made considerably shorter than the input taper. Depending upon the power of the laser used, the output taper from the body of the fiber to output face 228' may be only a few tens of centimeters long.*

*Upon exiting second face 228 of fiber 38, output beam 106 has an beam intensity profile resembling a mesa (or "top hat') function shown in FIG. 7. Output beam 106 will begin to diverge upon exiting fiber optic 38, as shown in FIG. 8. Objective lens system 110 in the work head 100 re-collimates and refocus beam 106 at a doublet lens 232 (or*

5 equivalent) so that beam 106 converges to waist 235 having width 236. Some radiation from output beam 106, upon impinging upon doublet lens 232, will be converted into unusable heat. To protect lens system 106 from heat damage a heat sink 230 and/or coolant circulating through tubes 42 and 44 may be attached to lens mount 234.

DISCUSSION FROM PRIOR APPLICATION 'L007 ENDS

Summation of Detailed Description

A system for treating surface material overlying the interior of a tube or pipe, and more particularly, to a system for ablating contaminates and other unwanted material from an interior tubular workpiece using a pulsed laser beam. The system includes three main sub-systems: a back end (30), a work head (100), and an umbilical tube 31 (31) to protect conduits communicating between the back end (30) and the work lead (100). The back end (30) includes heavy and bulky equipment such as a laser (32), chiller, pressurized air source (70), suction system, waste containment system, and electric power source (78). A conveyance such as a trailer may enclose the back end (30) to make it transportable. The work head (100) includes lightweight equipment such as laser beam radial directing module mirrors, optics. During operation, the work head (100) is inserted in one end of the tube. A flow air or gas is introduced at the other end of the tube sufficient to rotate a rotatable section of the work head by propeller vanes arranged around the circumference, between the work head and the tube interior. The laser (32) is activated. Then the radial beam directing module within the rotating section directs pulses from the laser beam according to a selected radial beam angle path or pattern and directs them to a path on the interior of the tubular workpiece. Ablated detritus may be suctioned through an exhaust conduit through the one end of the tube into an exhaust manifold and thence to the waste containment system in the back end (30). Electric power, laser energy, control and monitor signals, air, and suction are transported between the back end (30) and the work head (100) through the conduits provided. Although the description above contains many specificities, these should not be construed as limiting the scope of the invention but as merely providing illustrations of some of the presently preferred embodiments of this invention. Those skilled in the art will appreciate the various adaptations and modifications of the above described preferred embodiments which can be configured without departing from the scope and spirit of the invention. Therefore, it is understood that, within the scope of the appended claims and their legal equivalents, the invention may be practiced other than as specifically described herein.

We claim:

1. An apparatus having a back end system (30) including a base unit (32) capable of emitting a pulsed beam (38) of coherent electromagnetic radiation for treating a layer of surface material disposed on an interior tubular surface (52) of a workpiece (42), the interior tubular surface defined by a cylindrical volume having a central axis (44), the interior tubular surface extending inward from one open end of the cylindrical volume along a length of the central axis (44), a tubular interior surface cleaning assembly comprising:

a work head sized to enter the opening;
   work head support means for resiliently supporting the work head (100) in slidable contact with the interior tubular surface;
   a conduit connecting one end of the proximal head to the base unit; longitudinal connecting means between the work head (100) and the base unit cooperating with the conduit for moving the work head (100) in the direction of the central axis (44) with the work head support means supporting the work head (100) in slidable contact with the interior tubular surface;
   laser beam transport means for transporting the pulsed beam from the base unit to the work head (100), the work head (100) comprising;
   laser beam receiving means for receiving the pulsed laser beam from the laser beam transport means;
   laser beam directing means cooperating with the laser beam receiving means for movably directing the received pulsed laser beam from the laser beam receiving means to form a succession of adjacent impingement points disposed on the interior surface of the tubular workpiece (42);
   laser beam protective means for protecting optical laser elements transmitting the received laser beam from contamination by contaminants evolved by impingement of the received laser beam on said adjacent impingement points.

2. An apparatus as set forth in claim 1 including:
   coordinating means for coordinating the laser beam directing means, and the support member means, for positioning the work head within the tubular workpiece 42 so the succession of adjacent impingement points overlap sufficiently to effectively treat the surface material on the interior surface of the tubular workpiece 42.

3. The coordinating means of claim 2 coordinating the laser beam directing means, and the support member means for positioning the work head so the succession of adjacent impingement points overlap sufficiently to form a helical path on the interior of the surface having a pitch sufficiently small that adjacent spirals of the helical path overlap to sufficiently treat the surface material.

4. An apparatus as set forth in claim 1 including:
   means for receiving and redirecting the pulsed laser beam so that the surface material is substantially in the focal plane of the succession of overlapping impingement points.

5. An apparatus for treating surface material disposed on the tubular interior of a substrate with the tubular interior having a central axis, comprising:
   a laser capable of emitting a pulsed beam of coherent electromagnetic radiation;
   an optic fiber, capable of transporting the beam, positioned to accept the beam at a first face and a second face of the fiber positioned to deliver the beam to a work head (100);
   the work head (100) comprising:
   one or more lenses positioned to collimate and to focus the beam to an impingement point on the surface material;
   means for slidably positioning the work head in the tubular interior in the direction of the central axis;
   rotating means for scanning the beam relative to the surface material;
   means for positioning the beam so that the surface material is in the focal plane of the beams;
   optic fiber protective means for protecting the second face of the fiber from contamination by contaminants evolved from said impingement of said beam on said surface material.

6. A method for treating surface material disposed on the inside of a tubular substrate having a central axis, comprising:

steps for creating a pulsed beam of coherent electromagnetic radiation;

collimating and focusing the beam;

directing the beam to impinge on a face of a fiber optic;

delivering the beam through the fiber optic to one or more re-collimating and re-focusing elements;

re-collimating and re-focusing the beam by the one or more elements;

rotating the beam around the central axis relative to the surface material of the substrate;

delivering the beam to the surface material;

protecting said fiber optic delivering said beam from contamination by contaminants evolved by impingement of said beam on said surface material.

7. A method for treating an overlaying contaminant material disposed on a tubular interior substrate having a central axis, comprising:

creating a pulsed beam of coherent electromagnetic radiation;

collimating and focusing said beam;

directing said beam to be emitted from an exit face of a fiber optic;

guiding said beam from said fiber optic through one or more re-collimating and re-focusing elements;

rotating said beam received from said re-collimating and re-focusing elements around said central axis relative to said overlaying contaminant material on said substrate and delivering said beam to said surface material with sufficient energy to cause said overlaying contaminant to be released from said tubular interior substrate;

protecting said exit face by enclosing said exit face within an exit volume sealed from said release contaminant.

8. An apparatus having a backend system (30) including a base unit (32) capable of emitting a pulsed beam (38) of coherent electromagnetic radiation for treating a layer of surface material disposed on an interior tubular surface (52) of a workpiece (42), the interior tubular surface defined by a cylindrical volume having a central axis (44), said interior tubular surface extending inward from one open end of the cylindrical volume along a length of said central axis (44), said apparatus comprising a tubular interior surface cleaning assembly comprising:

a work head sized to enter said opening;

work head support means for resiliently supporting said work head (100) in slidable contact with said interior tubular surface;

a conduit connecting one end of said proximal head to said base unit;

longitudinal connecting means between said work head (100) and said base unit cooperating with said conduit for moving said work head (100) along said central axis 44 with said work head support means supporting said work head (100) in slidable contact with said interior tubular surface;

pulsed beam transport means for transporting said pulsed beam from said base unit to said work head (100);

an optical assembly disposed within said work head, cooperating with said base unit and said conduit for movably directing said pulsed beam to form a succession of adjacent impingement points disposed on said tubular surface, comprising means for receiving and directing said pulsed beam emitted from an emission point disposed on a fiber exit face of an optical fiber comprising said pulsed beam transport means;

said optical assembly further comprising contamination protection means defining a sealed exit volume enclosing there within said fiber exit face of said optical fiber, forming a emission point for emitting said pulsed beam from said exit face and cooperating with said base unit and said conduit for movably directing said pulsed beam to form a succession of adjacent impingement points disposed on said tubular surface, said sealed exit volume arranged to protect said emission point and said exit face from contamination by contaminants evolved by impingement of said directed pulsed beam on said adjacent impingement point.

9. An apparatus set forth in claim 8, in which said contamination protection means comprises:

a planar protective window having an outer perimeter, said window spaced apart from and between said fiber exit face and said impingement points, said window selected to pass said pulsed beam without significant energy loss;

a coaxial internal sleeve sized for receiving and positioning said exit face of said optical fiber within said sleeve for emitting said pulsed beam from said exit face toward said protective window, said outer perimeter and said sleeve sealingly connected to prevent contamination generated by impingement of said pulsed beam on said internal surface from contaminating said exit face of said optical fiber.

10. An apparatus as set forth in claim 9 comprising:

coordinating means for coordinating said optical assembly, said laser beam directing means, and said support member means, for positioning said work head within said tubular workpiece 42 so said succession of adjacent impingement points overlap sufficiently to effectively treat said surface material on said interior surface of said tubular workpiece 42.

11. An apparatus as set forth in claim 10, further comprising:

said coordinating means, said laser beam directing means, and said support member means for positioning said work head, cooperate, so that, said succession of adjacent impingement points overlap sufficiently to form a helical path on said interior of said surface having a pitch sufficiently small that adjacent spirals of said helical path overlap to sufficiently treat said surface material.

12. An apparatus as set forth in claim 8 including:

means for receiving and redirecting said pulsed laser beam so that said surface material is substantially in said focal plane of said succession of overlapping impingement points;

conduit moving means cooperating with said conduit for moving said conduit in said direction of said central axis (44) of said interior surface.

13. An apparatus having a backend system (30) including a base unit (32) capable of emitting a pulsed beam (38) of coherent electromagnetic radiation for treating a layer of surface material disposed on an interior tubular surface (52) of a workpiece (42), the interior tubular surface defined by a cylindrical volume having a central axis (44), said interior tubular surface extending inward from one open end of the cylindrical volume along a length of said central axis (44), said apparatus comprising a tubular interior surface cleaning assembly comprising:

a work head sized to enter said opening;

work head support means for resiliently supporting said work head (100) in slidable contact with said interior tubular surface;

a conduit connecting one end of said proximal head to said base unit;

longitudinal connecting means between said work head (100) and said base unit cooperating with said conduit for moving said work head (100) along said central axis 44 with said work head support means supporting said work head (100) in slidable contact with said interior tubular surface;

pulsed beam transport means for transporting said pulsed beam from said base unit to said work head (100);

an optical assembly disposed within said work head, cooperating with said base unit and said conduit for movably directing said pulsed beam to form a succession of circumferentially adjacent impingement points disposed on said tubular surface, comprising means for receiving and directing said pulsed beam emitted from an emission point disposed on a fiber exit face of an optical fiber comprising said pulsed beam transport means;

a pinch roller apparatus frictionally engaged with said conduit, controlled to move said work head along said central axis within said workpiece by cooperation with members selected from the group of said pulsed beam transport means, said longitudinal connecting means, said work head, said optical assembly, and said back end system, such that successive ones of said impingement points are spaced apart by a predetermined distance, Cd, along a continuous spiral, and adjacent turns of said spiral are spaced apart by said distance, Cd.

14. An apparatus as set forth in claim 13, said optical assembly further comprising:

contamination protection means defining a sealed exit volume enclosing there within said fiber exit face of said optical fiber, forming a emission point for emitting said pulsed beam from said exit face, said sealed exit volume arranged to protect said emission point and said exit face from contamination by contaminants evolved by impingement of said directed pulsed beam on said adjacent impingement points.

15. An apparatus as set forth in claim 14, in which said contamination protection means comprises:

a planar protective window having an outer perimeter, said window spaced apart from and between said fiber exit face and said impingement points, said window selected to pass said pulsed beam without significant energy loss;

a coaxial internal sleeve sized for receiving and positioning said exit face of said optical fiber within said sleeve for emitting said pulsed beam from said exit face toward said protective window, said outer perimeter and said sleeve sealingly connected to prevent contamination generated by impingement of said pulsed beam on said internal surface from contaminating said exit face of said optical fiber.

16. A method for treating an overlaying contaminant material disposed on a tubular interior substrate having a central axis, comprising:

creating a pulsed beam of coherent electromagnetic radiation;

collimating and focusing said beam;

directing said beam to be emitted from an exit face of a fiber optic;

guiding said beam from said fiber optic through one or more re-collimating and refocusing elements;

rotating said beam received from said re-collimating and re-focusing elements around said central axis relative to said overlaying contaminant material on said substrate and delivering said beam to said surface material with sufficient energy to cause said overlaying contaminant to be released from said tubular interior substrate;

protecting said exit face by enclosing said exit face within an exit volume sealed from said released contaminant;

providing a longitudinal umbilical tube mechanically coupled by a rigid proximal end to said re-collimating and re-focusing elements;

moving said delivered beam longitudinally parallel to said central axis by a pinch roller apparatus frictionally engaged with said umbilical tube and disposed to move said tube longitudinally parallel to said central axis.

17. The method as set forth in claim 16, comprising:

controlling said moving of said tube and said rotating of said beam such that said beam describes a spiral path inside said tubular interior substrate.

18. The method as set forth in claim 17, comprising:

causing said moving of said tube by said pinch roller apparatus to be a speed, S, such that each adjacent spiral is spaced apart by a predetermined distance, Cd.

* * * * *